United States Patent
Fritz et al.

(10) Patent No.: US 11,321,049 B2
(45) Date of Patent: May 3, 2022

(54) FAST BINARY COUNTERS BASED ON SYMMETRIC STACKING AND METHODS FOR SAME

(71) Applicant: The Research Foundation for The State University of New York, Amherst, NY (US)

(72) Inventors: Christopher Fritz, Buffalo, NY (US); Adly T. Fam, East Amherst, NY (US)

(73) Assignee: The Research Foundation for The State University of New York, Amherst, NY (US)

( * ) Notice: Subject to any disclaimer, the term of this patent is extended or adjusted under 35 U.S.C. 154(b) by 0 days.

(21) Appl. No.: 16/610,761

(22) PCT Filed: May 4, 2018

(86) PCT No.: PCT/US2018/031268
§ 371 (c)(1),
(2) Date: Nov. 4, 2019

(87) PCT Pub. No.: WO2018/204898
PCT Pub. Date: Nov. 8, 2018

(65) Prior Publication Data
US 2020/0394017 A1     Dec. 17, 2020

Related U.S. Application Data

(60) Provisional application No. 62/501,731, filed on May 4, 2017.

(51) Int. Cl.
*G06F 30/327*     (2020.01)
*G06F 113/02*     (2020.01)
(Continued)

(52) U.S. Cl.
CPC ............ *G06F 7/505* (2013.01); *G06F 30/327* (2020.01); *G06F 2113/02* (2020.01)

(58) Field of Classification Search
CPC .... G06F 7/505; G06F 30/327; G06F 2113/02; G06F 7/48; G06F 7/607; G06F 78/50; G06F 113/02
See application file for complete search history.

(56) References Cited

U.S. PATENT DOCUMENTS

| | | | |
|---|---|---|---|
| 4,600,986 A | | 7/1986 | Scheuneman et al. |
| 5,045,913 A | * | 9/1991 | Masleid ................ H01L 23/528 |
| | | | 257/409 |

(Continued)

OTHER PUBLICATIONS

Masumdar, R.E., Design of High Performance Wallace Tree Multiplier Using Compressors and Parellel Prefix Adders, International Journal of Electrical, Electronics and Data Communication, Oct. 2016, vol. 4, No. 10, pp. 95-99.

(Continued)

*Primary Examiner* — Vuthe Siek
(74) *Attorney, Agent, or Firm* — Hodgson Russ LLP

(57) ABSTRACT

In this paper, binary stackers and counters are presented. In an embodiment, a counter uses 3-bit stacking circuits which group T bits together, followed a symmetric method to combine pairs of 3-bit stacks into 6-bit stacks. The bit stacks are then converted to binary counts, producing 6:3 and 7:3 Counter circuits with no XOR gates on the critical path. This avoids of XOR gates results in faster designs with efficient power and area utilization. In VLSI simulations, the presently-disclosed counters were 30% faster and at consumed at least 20% less power than existing parallel counters. Additionally, using the presently-disclosed counter in existing Counter Based Wallace tree multiplier architectures reduce latency and improves efficiency in term of power-delay product for 64-bit and 128-bit multipliers.

3 Claims, 18 Drawing Sheets

(51) Int. Cl.
   *G06F 7/50*  (2006.01)
   *G06F 7/48*  (2006.01)
   *G06F 7/505* (2006.01)

(56) References Cited

U.S. PATENT DOCUMENTS

| | | | |
|---|---|---|---|
| 5,339,421 A * | 8/1994 | Housel, III | G06F 9/54 |
| | | | 719/328 |
| 5,347,482 A | 9/1994 | Williams | |
| 5,583,806 A | 12/1996 | Widigen et al. | |
| 6,029,187 A | 2/2000 | Verbauwhede | |
| 6,125,379 A | 9/2000 | Lin | |
| 6,883,011 B2 | 4/2005 | Rumynin et al. | |
| 7,272,624 B2 | 9/2007 | Belluomini et al. | |
| 8,214,414 B2 | 7/2012 | Ramanarayanan et al. | |
| 8,645,448 B2 | 2/2014 | Elliott | |
| 9,710,228 B2 | 7/2017 | Rarick | |
| 2005/0240646 A1 | 10/2005 | Lin | |
| 2008/0172437 A1 | 7/2008 | Carroll | |
| 2016/0124746 A1 | 5/2016 | Lutz et al. | |
| 2016/0335055 A1 | 11/2016 | Exall et al. | |

OTHER PUBLICATIONS

Bais, K., et al., Design of a High-Speed Wallace Tree Multiplier, International Journal of Engineering Sciences & Research Technology, Jun. 2016, pp. 476-480.

Akila, A., et al., Design and Implementation of Area Efficient Counters Based on Novel, International Journal of Scientific Research and Review, Mar. 26, 2018, vol. 7, No. 2, pp. 131-137.

Dandapat, A., et al., A 1.2-ns16×16-Bit Binary Multiplier Using High Speed Compressors, International Journal of Electronics and Communication Engineering, Dec. 2010, vol. 4, No. 3, pp. 485-490.

Kirthica, S., et al., Design and Simulation of Wallace Tree Multiplier using Compressor, International Journal of Advanced Research in Computerand Communication Engineering, Nov. 2016, vol. 5, No. 11, pp. 268-270.

Ghasemzadeh, M., et al., A Novel Fast Glitchless 7-3 Counter with a New Structure, Proceedings of the 21st International Conference on Mixed Design of Integrated Circuits & Systems (MIXDES), Jul. 19, 2014, pp. 131-134.

Karthick, S., et al., Design and Analysis of Low Power Compressors, International Journal of Advanced Research in Electrical, Electronics and Instrumentation Engineering, Dec. 2012, vol. 1, No. 6, pp. 487-493.

* cited by examiner

FAST BINARY COUNTERS BASED ON SYMMETRIC STACKING AND METHODS FOR SAME

CROSS-REFERENCE TO RELATED APPLICATIONS

This application claims priority to U.S. Provisional Application No. 62/501,731, filed on May 4, 2017, now pending, the disclosure of which is incorporated herein by reference.

FIELD OF THE DISCLOSURE

The present disclosure relates to logic circuits, and in particular binary counter circuits.

BACKGROUND OF THE DISCLOSURE

High speed, efficient addition of multiple operands is an essential operation in any computational unit. The speed and power efficiency of multiplier circuits is of critical importance in the overall performance of microprocessors. Multiplier circuits are an essential part of an arithmetic logic unit or a digital signal processor system for performing filtering and convolution. The binary multiplication of integers or fixed point numbers results in partial products which must be added to produce the final product. The addition of these partial products dominates the latency and power consumption of the multiplier.

In order to combine the partial products efficiently, column compression is commonly used. Many methods have been presented to optimize the performance of the partial product summation, such as the well-known row compression techniques in the Wallace Tree or Dadda Tree, or the improved architecture in Z. Wang, G. A. Jullien, and W. C. Miller, "A New Design Technique for Column Compression Multipliers," IEEE Transactions on Computers, vol. 44, no. 8, pp. 962-970, August 1995. These methods involve using full adders functioning as counters to reduce groups of three bits of the same weight to two bits of different weight in parallel using a carry-save adder tree. Through several layers of reduction, the number of summands is reduced to two, which are then added using a conventional adder circuit.

To achieve higher efficiency, larger numbers of bits of equal weight can be considered. The basic method when dealing with larger numbers of bits is the same: bits in one column are counted, producing fewer bits of different weights. For example, a 7:3 Counter circuit accepts seven bits of equal weight and counts the number of '1' bits. This count is then output using 3 bits of increasing weight. A 7:3 Counter circuit can be constructed using full adders as shown in FIG. 1.

Much of the delay in these counter circuits is due to the chains of XOR gates on the critical path. Therefore, many faster parallel counter architectures have been presented. A parallel 7:3 counter was presented and was subsequently used to design a high speed Counter Based Wallace Tree multiplier. Additionally, known counter designs use multiplexers to reduce the number of XOR gates on the critical path. Some of these muxes can be implemented with transmission gate logic to produce even faster designs.

Despite the improvements in the existing techniques, there remains a need to design faster, smaller, and more efficient circuits.

BRIEF SUMMARY OF THE DISCLOSURE

A method for binary counting using a symmetric bit-stacking approach is presented. The disclosed counting method can be used to implement 6:3 and 7:3 Counters, which can be used in any binary multiplier circuit to add the partial products. Counters implemented with the present bit stacking technique can achieve higher speed than other counter designs while also saving power. This is due to the lack of XOR gates and multiplexers on the critical path. 64-bit and 128-bit Counter Based Wallace Tree multipliers built using the presently-disclosed 6:3 Counters outperform both the standard Wallace Tree implementation as well as multipliers built using existing 7:3 Counters.

DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE DISCLOSURE

Figure 1:
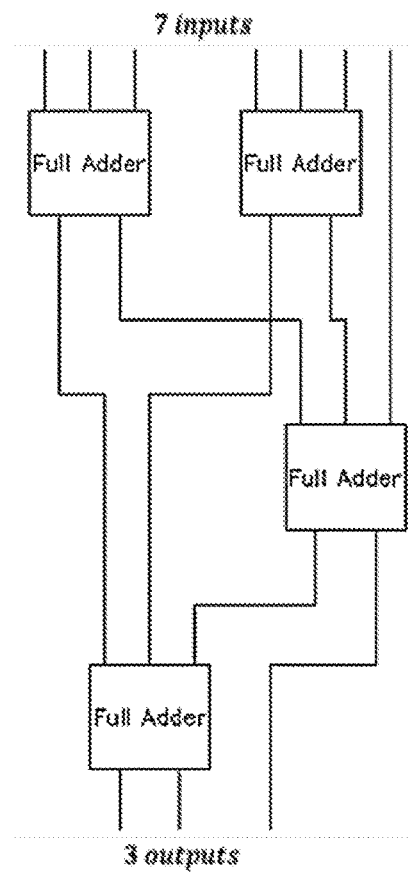
FIG. 1 is a 7:3 counter made from full adders (3:2 Counters)

The present disclosure may be embodied as a counting method that uses bit stacking circuits followed by a method of combining two small stacks to form larger stacks. A 6:3 counter built using this method uses no XOR gates or multiplexers on its critical path. VLSI simulation results show that the presently-disclosed 6:3 counter is at least 30% faster than existing counter designs while also using less power. Simulations were also run on full multiplier circuits for various sizes. The same Counter Based Wallace (CBW)

multiplier design was used for each simulation while the internal counter was varied. Use of the presently-disclosed counter improves multiplier efficiency for larger circuits, yielding 64- and 128-bit multipliers that are both faster and more efficient, at least by 25% and 40%, respectively, in terms of power-delay product (PDP). It outperforms the fastest in terms of latency and it consumes less power than the most efficient, meaning that the use of the presently-disclosed counter in a CBW multiplier yields a pure gain.

Bit Stacking

The present disclosure proposes a new paradigm for computer arithmetic designs called bit stacking. Exemplary circuits are presented that stack 3 bits, then 6 bits, and a discussion is provide to show how the principles used in those circuits can be used to build circuits that stack vectors of many more sizes. In the present disclosure, the focus will be on the use of these bit stacking circuits to design binary counters. Ultimately, these counters may used in, for example, large multiplier circuits to produce substantial savings in terms of latency and power consumption over the prior art counter designs. However, although these counter circuits based on bit stacking will achieve high performance and low power consumption, a large part of the delay and complexity comes from converting the bit stacks to binary counts. Thus, the present disclosure provides applications that do not require binary counts but can make use of the bit stacks directly. Such applications can achieve very large performance improvements using bit stacking.

Consider a b-bit vector X that has k '1' bits and b−k '0' bits. The present disclosure illustrates X as a proper bit stack if:

$$X_i = \begin{cases} 1 & i < k \\ 0 & \text{otherwise} \end{cases} \quad i = 0 \cdots b-1 \quad (1)$$

Bit stacking is an intuitive concept that can be visualized as pushing all of the '1' bits together. The length of the bit stack is exactly the number of '1' bits in X, which the present disclosure will define later as the Population Count of X. Determing the count from a stacked vector is much simpler than adding up the '1' bits to determine the count.

It should be noted that, although various embodiments herein are circuits that operate on binary vectors with an even number of bits, a vector having an odd number of bits may be accommodated by the addition of another bit having a value of '0'.

In a first embodiment, the present disclosure may be embodied as a method of stacking a 2b-bit binary vector. The 2b-bit vector is split into a first set of b bits, and a second set of b bits. No bits of the 2b-bit vector are used in both the first set and the second set. The method includes stacking the first set such that any bits having a value of '1' occupy the least significant bits. The second set is stacked such that any bits having a value of '1' occupy the most significant bits. In some embodiment, the first set may be stacked such that the '1' bits occupy the most significant bits and then the set is reversed.

For each bit of the first set and the second set, determine if a bit of the first set or a corresponding bit of the second set has a value of '1'. If so, a corresponding bit of a third set is set to '1'. For each bit of the first set and the second set, determine if a bit of the first set and a corresponding bit of the second set has a value of '1'. If so, a corresponding bit of a fourth set is set to '1'. As such, concatenating the third and fourth sets will result in a 2b-bit vector where all of the '1' bits—if any—are in the center of the vector (surrounded by '0' bits—if any) or all of the '0' bits—if any—are in the center (surround by '1' bits—if any).

The third set is stacked such that any bits having a value of '1' occupy the most significant bits; and the fourth set is stacked such that any bits having a value of '1' occupy the most significant bits. The method may further include concatenating the stacked third set and the stacked fourth set to form an 2 b-bit stacked output.

In another embodiment, the disclosure may be embodied as a method of counting a 6-bit binary vector. The 6-bit vector is split into a first set of 3 bits, and a second set of 3 bits, wherein no bits of the 6-bit vector are used in both the first set and the second set. As in the stacker embodiment above, the first set is stacked such that any bits having a value of '1' occupy the least significant bits. The second set such that any bits having a value of '1' occupy the most significant bits.

A parity of the 6-bit vector is determined. In some embodiments, the parity of the 6-bit vector is determined by determining a parity of each of the first set (a first parity) and the second set (a second parity). Then, recognizing that adding two different parity values yields an odd parity, while adding two of the same parity values yields an even parity, the parity of the 6-bit vector may be determined from the first parity and the second parity.

For each bit of the first set and the second set, we determine if a bit of the first set and a corresponding bit of the second set has a value of '1', and setting a corresponding bit of a third set to '1'. $C_1$ is determined as '1' if any of the following conditions is met: (1) at least one bit of the first set has a value of '1' and at least one bit of the second set has a value of '1'; (2) all bits of the third set have a value of '0'; or (3) all bits of the first set and all bits of the second set have a value of '1'. $C_2$ is determined based on all bits of the third set having a value of '1'.

A count (i.e., a count of the number of '1' bits in the 6-bit vector) is provided as $C_2 C_1 S$.

Discussion

Non-limiting embodiments of the present disclosure are further described and discussed below.

Symmetric Bit Stacking: 6-Bits

Figure 7:
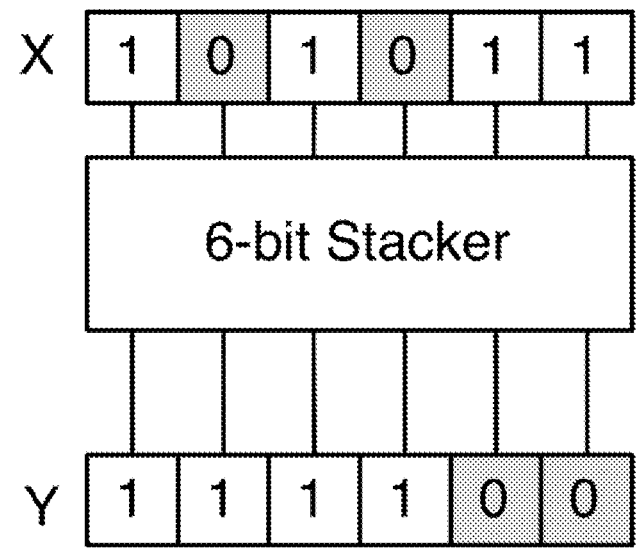
FIG. 7 is a diagram of a 6-bit stacker module.
Figure 8:
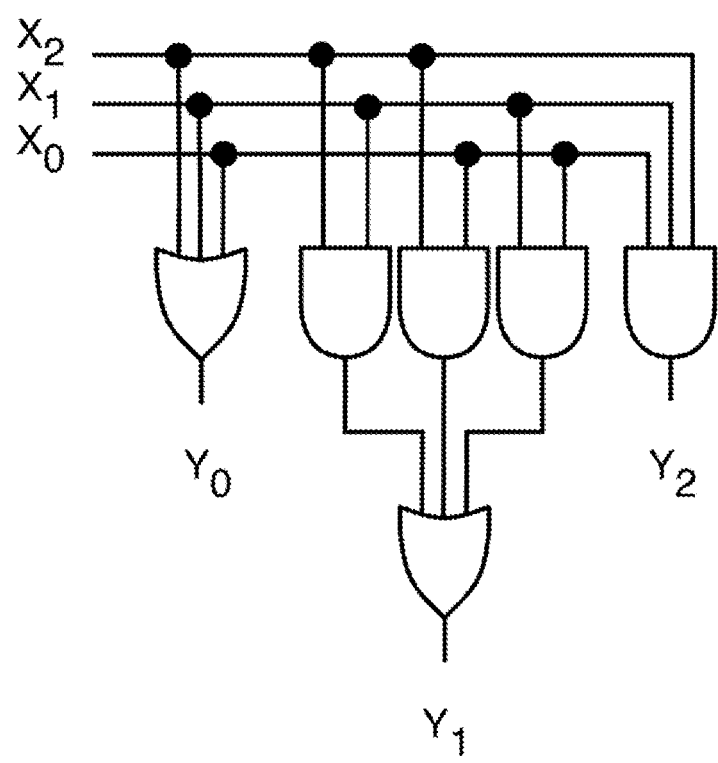
FIG. 8 is a diagram of a 3-bit stacker primitive.

A 6:3 counter according to an embodiment of the present disclosure is realized by first stacking all of the input bits such that all of the '1' bits are grouped together. After stacking the input bits, this stack can be converted into a binary count to output the 6-bit count. Small 3-bit stacking circuits are first used to form 3-bit stacks. These 3-bit stacks are then combined to make a 6-bit stack using a symmetric technique that adds one extra layer of logic. The present disclosure illustrates a b-bit stack as a vector of b bits being arranged such that the '1' bits precede the '0' bits. It should be noted that the absolute order (e.g., '1's preceding '0's, or '0's preceding '1's) is a matter of convention for the convenience of the disclosure, while relative order (e.g., a first set of bits having '1's followed by '0's as compared to a second set of bits having '0's followed by '1's) may be used to illustrate a concept necessary to the operation of an embodiment. Furthermore, reference (in the absolute sense) to left or right, leftmost or rightmost, least significant bit or most significant bit, first or last, etc. are used for convenience of illustration and should not be interpreted as limiting. In embodiments, reference to least- or most-significant bit are used as a familiar convention to illustrate position, while each bit may have no more significance than another. A b-bit stacker is a circuit that accepts b arbitrary bits and has a b bit output that is a bit stack. The number of '1' bits in the output vector is the same as the number of '1' bits in the input vector. This top-level module is represented in FIG. 7 for a 6-bit stacker with a simple example.

3-Bit Stacking Circuit

In the exemplary 6-bit stacker, the primitive stacking circuit we will use is a 3-bit stacker. Given inputs $X_0$, $X_1$, and $X_2$, a 3-bit stacker circuit will have three outputs $Y_0$, $Y_1$, and $Y_2$ such that the number of '1' bits in the outputs is the same as the number of '1' bits in the inputs, but the '1' bits are grouped together to the left followed by the '0' bits. It is clear that the outputs are then formed by:

$$Y_0 = X_0 + X_1 + X_2 \tag{2}$$

$$Y_1 = X_0 X_1 + X_0 X_2 + X_1 X_2 \tag{3}$$

$$Y_2 = X_0 X_1 X_2 \tag{4}$$

Figure 2:
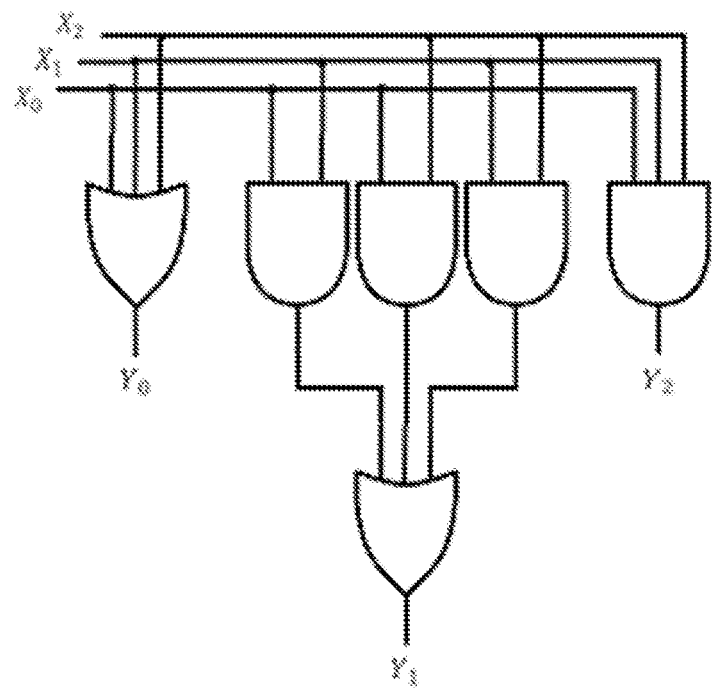
FIG. 2 is a 3-bit stacker circuit according to an embodiment of the present disclosure.

Namely, the first output will be '1' if any of the inputs is '1', the second output will be '1' if any two of the inputs are '1', and the last output will be '1' if all three of the inputs are '1'. An exemplary 3-bit stacking circuit is shown in FIG. 2.

Merging Stacks

The two smaller stacks may be merged into one large one. We wish to form a 6-bit stacking circuit using the 3-bit stacking circuits discussed. Given six inputs $X_0, \ldots, X_5$, we first divide them into two groups of three bits which are stacked using 3-bit stacking circuits. Let $X_0$, $X_1$, and $X_2$ be stacked into signals named $H_0$, $H_1$, and $H_2$ and $X_3$, $X_4$, and $X_5$ be stacked into $I_0$, $I_1$, and $I_2$. First, we reverse the outputs of the first stacker and consider the six bits $H_2 H_1 H_0 I_0 I_1 I_2$. See the top of FIG. 3 for an example of this process. We notice that within these six bits, there is a train of '1' bits surrounded by '0' bits. To form a proper stack, this train of '1' bits should start from the leftmost bit.

In order to form the 6-bit stack output, two more 3-bit vectors of bits are formed called $J_0$, $J_1$, $J_2$ and $K_0$, $K_1$, $K_2$. The objective is to fill the J vector with ones before entering ones in the K vector. So we let:

$$J_0 = H_2 + I_0 \tag{5}$$

$$J_1 = H_1 + I_1 \tag{6}$$

$$J_2 = H_0 + I_2 \tag{7}$$

In this way, the first three '1' bits of the train fill into the J bits although they may not be properly stacked. Now to ensure no bits are counted twice, the K bits are formed using the same inputs but with AND gates instead:

$$K_0 = H_2 I_0 \tag{8}$$

$$K_1 = H_1 I_1 \tag{9}$$

$$K_2 = H_0 I_2 \tag{10}$$

In this way, the J bits will fill before the K bits. Focusing on the J vector, if one, two, or three of the input bits are set, we can see from Equations, 5, 6, and 7 that the same number of J bits will be set as none of the expressions have any overlap but together they cover all six bits from H and I. Now we consider the K bits. Note that Equations 8, 9, and 10 give the three possibilities when four input bits are set: either the left 3-bit stack was full and we had one '1' bit from the right 3-bit stack, or there were two '1's in each of the 3-bit stacks, or we had one '1' but from the left 3-bit stack and a full stack on the right. Because the inputs to the AND gates are spaced by three bits, and because $H_0, H_1, H_2 I_0, I_1 I_2$ contains a continuous train of '1' bits if more than three inputs are '1's, any extra bits will spill into the K vector. The entire symmetric bit stacking process for b=6 bits is illustrated by an example in FIG. 3.

If the train of '1's is no more than three places long, then all of the K bits will be '0' as the AND gate inputs are three positions apart. If the train is longer than three places long, then some of the AND gates will have both inputs as '1's as the AND gate inputs are three positions apart. The number of AND gates that will have this property will be three less than the length of the train of '1's.

We notice that now $J_0 J_1 J_2$ and $K_0 K_1 K_2$ still contain the same number of '1' bits as the input in total but now the J bits will be filled with ones before any of the K bits. We must now stack $J_0 J_1 J_2$ and $K_0 K_1 K_2$ using two more 3-bit stacking circuits. The outputs of these two circuits can then be concatenated to form the stacked outputs $Y_5, \ldots, Y_0$.

Figure 3:
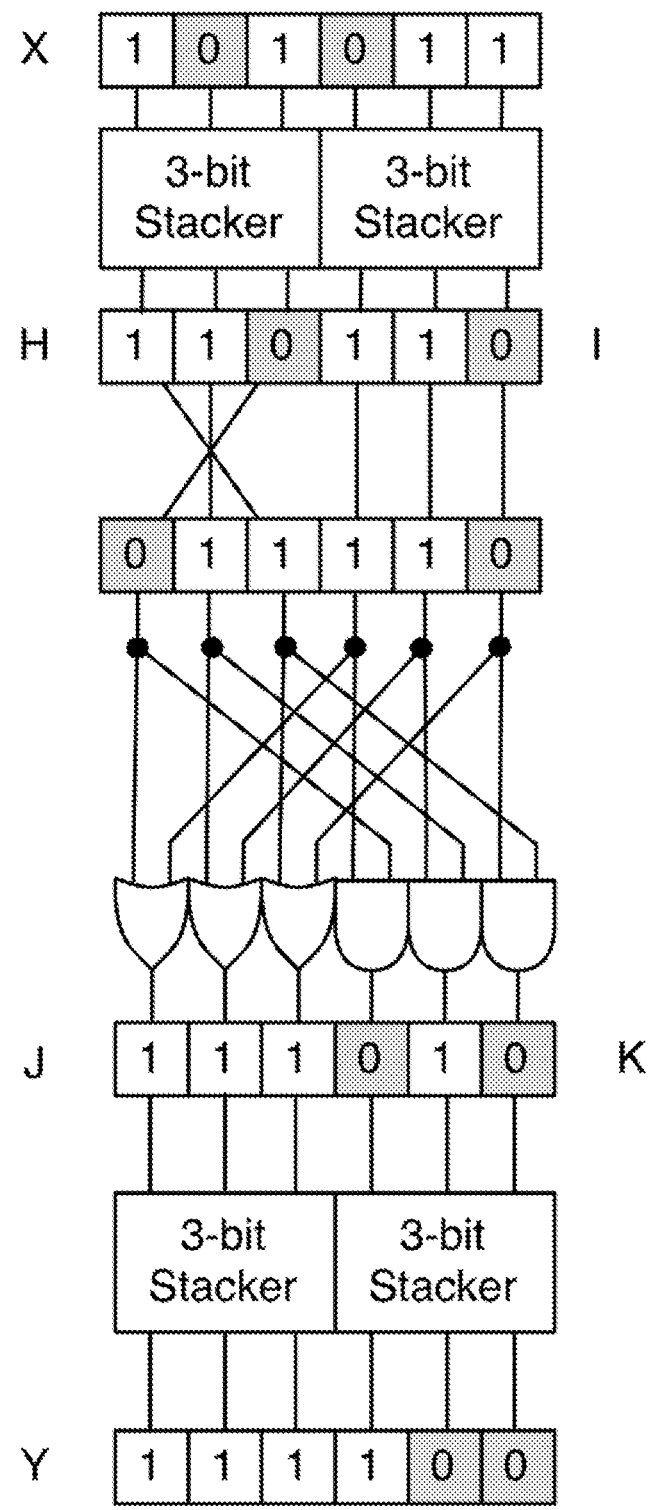
FIG. 3 is a diagram showing a 6-bit stacking example according to another embodiment of the present disclosure.

An example of this process is shown for an input vector containing four '1' bits in FIG. 3. In this example, first the H and I vectors are formed by stacking groups of three input bits. Then the H vector is reversed, forming a continuous train of four '1' bits surrounded by zero bits. Corresponding bits are OR-ed to form the J vector which is full of '1' bits. Corresponding bits are AND-ed to form the K vector which finds exactly one overlap. Then the J and K vectors are restacked to form the final 6-bit stack.

Symmetric Bit Stacking: General Case

Let us explain in further detail the process of creating bit stacks, this time for arbitrarily large input vectors, as it represents the main novelty in the presently-disclosed stacker-based counter design. While this method is presented, for convenient illustration, as generating one 6-bit stack from two 3-bit stacks, it can be used to merge two binary stacks of any equal sizes into one larger stack. The process of properly merging two stacks into one larger stack can be very significant as the length of a stack directly represents the count of the number of '1' bits in a binary vector and as such can be use for binary counters with many applications, as we will demonstrate in the subsequent sections. The primary use case illustrated herein is to use the stacking method to build Counter-based Multiplier (CBM) circuits, which rely on counters that are typically on the order of 3 to 7 inputs to compress bits of equal weight into fewer bits of increasing weight. Applying the presently-disclosed stacker-based counters to multiplier circuits may be advantageous given how important multiplier circuits are to all computational units.

Let us define the operator Pc( ), which operates on a b-bit vector of bits Q and returns the number of '1' bits in that vector.

$$Pc(Q) = \sum_{k=0}^{b-1} Q_k \tag{11}$$

This count is also referred to as the Population Count. For example, Pc([1,1,0,1])=3 and Pc([0,1,1,0,1])=4. Now, let us represent the problem of stacking in terms of an arbitrary number of bits. Consider the input vector X, which has 2b bits. We do not assume anything about these bits. Our stacking method should operate on the X vector and produce a 2b-bit long vector Y that has two properties. First, Y should be a proper bit stack. This means that Y must have an uninterrupted train of '1' bits followed by an uninterrupted train of '0' bits. Second, the number of '1' bits in Y should be the same as the number of '1' bits in X. We call this count c:

$$c = Pc(X) = Pc(Y) \tag{12}$$

In other words, we want to design a circuit that accepts a 2b-bit arbitrary input and produces a 2b-bit properly stacked output. Intuitively we can think of this as pushing all of the '1' bits in X together until they all are compressed into one train of bits, leaving the '0' bits behind. The first step of the bit stacking process is to divide the vector X into two vectors that are each b-bits long. Then each b-bit long vector is passed into a b-bit stacker circuit. The b-bit stacker is a circuit that accepts a b-bit arbitrary input and produces a b-bit stack as output. The stacking process described here may thus be recursively applied until a base case is reached. Once the stacker input is small enough (e.g., b=3 in the discussion above), a simple combinational logic design can be produced to form the bit stack. After passing both halves of the 2b input bits from X into b-bit stackers, the we will have two proper bit stacks that are both of length b-bits. We call these two properly stacked vectors H and I respectively. Our problem is then to merge these two b-bit stacks into one larger 2b-bit stack that will become the output Y of the stacking circuit.

We will now provide a deeper explanation and analysis of the stack merging technique. Let us assume we have two binary stacks each of length b-bits. This means that by the definition of a bit stack, each of these b bits includes a train of '1' bits aligned with the left end of the stack, followed by '0' bits. Let us call the number of '1' bits in the first stack k and the number of '1' bits in the second stack l:

$$c = k + l \tag{13}$$

$$k = Pc(H) \tag{14}$$

$$l = Pc(I) \tag{15}$$

This means that the first stack, which we call H, is a b-bit vector that includes k '1' bits followed by b−k '0' bits, and the second stack, which we call I, is a b-bit vector that includes l '1' bits followed by b−l '0' bits. Therefore, the process of merging two stacks together should produce a single properly-formed bit stack consisting of 2b bits in which the first (e.g., leftmost) k+l bits are '1's followed by 2b−k−l '0' bits. We will show how to combine the two smaller stacks of length b into one larger stack of length 2b in one logical step plus the time it takes to stack b bits. This therefore results in a stack merging process that takes $\mathcal{O}(b)$ time to execute.

The intuition of the stack merging process starts from the perspective of trying to paste the group of '1' bits together without worrying about the position of the resulting train of '1' bits in the new vector of bits. We know that both of the smaller stacks start with the '1' bits aligned with the left end. Therefore, if the bits in the H stack are called $H_0$, $H_1$, ..., $H_{b-1}$, $H_b$, then we will consider the bits in the order $H_b$, $H_{b-1}$, ..., $H_1$, $H_0$. This represents an intuitive step but in implementation this is simply completed through wiring changes. Although one might argue that this adds wiring complexity in a CMOS layout, in practice we can perform this reversal with minimal extra wiring layers using smart layout techniques. Furthermore, as we will discuss next, counters based on stackers use fewer internal networks and therefore have less wiring complexity overall. We therefore claim that the additional wiring complexity added by this reversal process is inconsequential in the overall complexity of the design. We will now consider the reversed vector of H bits followed by the I vector in its normal order, $H_b$, $H_{b-1}$, ..., $H_1$, $H_0$, $I_0$, $I_1$, ..., $I_{b-1}$, $I_b$. This 2b-bit vector is not a properly formed stack, but we can guarantee that it does have an uninterrupted train of '1' bits whose length is exactly k+l, surrounded on either sides by '0' bits. More specifically, it has b−k '0' bits, then k+l '1' bits, then b−l '0' bits. Intuitively, our goal at this stage is to move all of the '1' bits over to the left so that we have a proper bit stack that starts with the train of '1' bits followed by the '0' bits. Practically, we will accomplish this by considering two more temporary vectors called J and K. Recall that at this point we have not added any additional logic after the initial b-bit stacking process that created the H and I vectors in the first place.

We will split the process of combining the two stacks into one larger stack into two stages. First we will form two new vectors J and K each comprised of b bits. The requirement that will be satisfied is that the J bits are completely filled before any bits spill into the K vector. In other words, if the number of '1' bits in the H and I vectors is less than or equal to b, then all of these bits must be contained in the J vector. If the number of bits in the H and I vectors is greater than b, the first b of these bits must appear in the J vector, and then the remaining bits will be taken into the K vector. More specifically, as we know the vector X contains c=k+l '1' bits, then the number of '1' bits that will appear in the J vector is:

$$Pc(J) = \min(b, c) \tag{16}$$

$$Pc(K) = \max(0, c-b) \tag{17}$$

We now discuss how to form the vectors J and K that have this property. Recall that we currently have a vector of bits $H_b$, $H_{b-1}$, ..., $H_1$, $H_0$, $I_0$, $I_1$, ..., $I_{b-1}$, $I_b$ in which there is an uninterrupted train of '1' bits surrounded by '0' bits. To form the J vector that has the first b '1' bits in this train, it is sufficient to consider pairs of bits that are b places apart in the combined vector of bits. If we logically OR these pairs, then all of the bits will be considered at least once. If the length of the train of '1' bits in the H and I vectors is less than b-bits long, then each of the bits will appear in one of these pairs only once. If the length of the train is longer than b bits, then the excess bits will result in both inputs to the OR gates being '1':

$$J_i = H_{b-1} + I_i \quad i = 0, \ldots, b-1 \tag{18}$$

In this way, the J vector will contain up to b '1' bits in the train of '1' bits. Now we must consider the K vector, which should contain the excess bits of the train of '1' bits when that train is longer than b bits long. Intuitively, imagine a filter that moves across the 2b bit vector looking at pairs of bits that are again b places apart. This filter will see two '1' inputs when it is totally contained in the train of '1' bits and this will happen in c−b positions as the lter moves along the bits. If we logically and the inputs to this filter, we will have the filter output '1' exactly c−b times. Now we simply replace the notion of a sliding filter with parallel AND functions operating on pairs of bits separated by b positions:

$$J_i = H_{b-i} I_i \quad i = 0, \ldots, b-1 \tag{19}$$

We have now formed the J and K vectors that follow the constraints we specified above: The J vector contains the first b bits of the train of '1's in the outputs from the first phase of stackers. The K vector contains additional bits beyond the first b '1's. Note that:

$$Pc(J) + Pc(K) = c = Pc(X) \tag{20}$$

We still have the same population count in the two vectors, but they still may not be proper bit stacks. However, we now have guaranteed that the first b '1' bits will appear in the J vector, and any remaining bits will appear in the K vector. All that is needed at this phase is to stack the J vector and the K vector and simply concatenate these two proper bit stacks. If c≤b, then the entire stack will appear in the output of the stacker that operates on J, and all of the K bits will be '0'. If c>b, then all of the J bits will be '1' and the remaining bits will be stacked from the K vector to a proper bit stack that will simply be appended to the b '1' bits resulting from the stacking of J. We simply take the output Y as the concatenation of the stacker moutputs.

Figure 9:
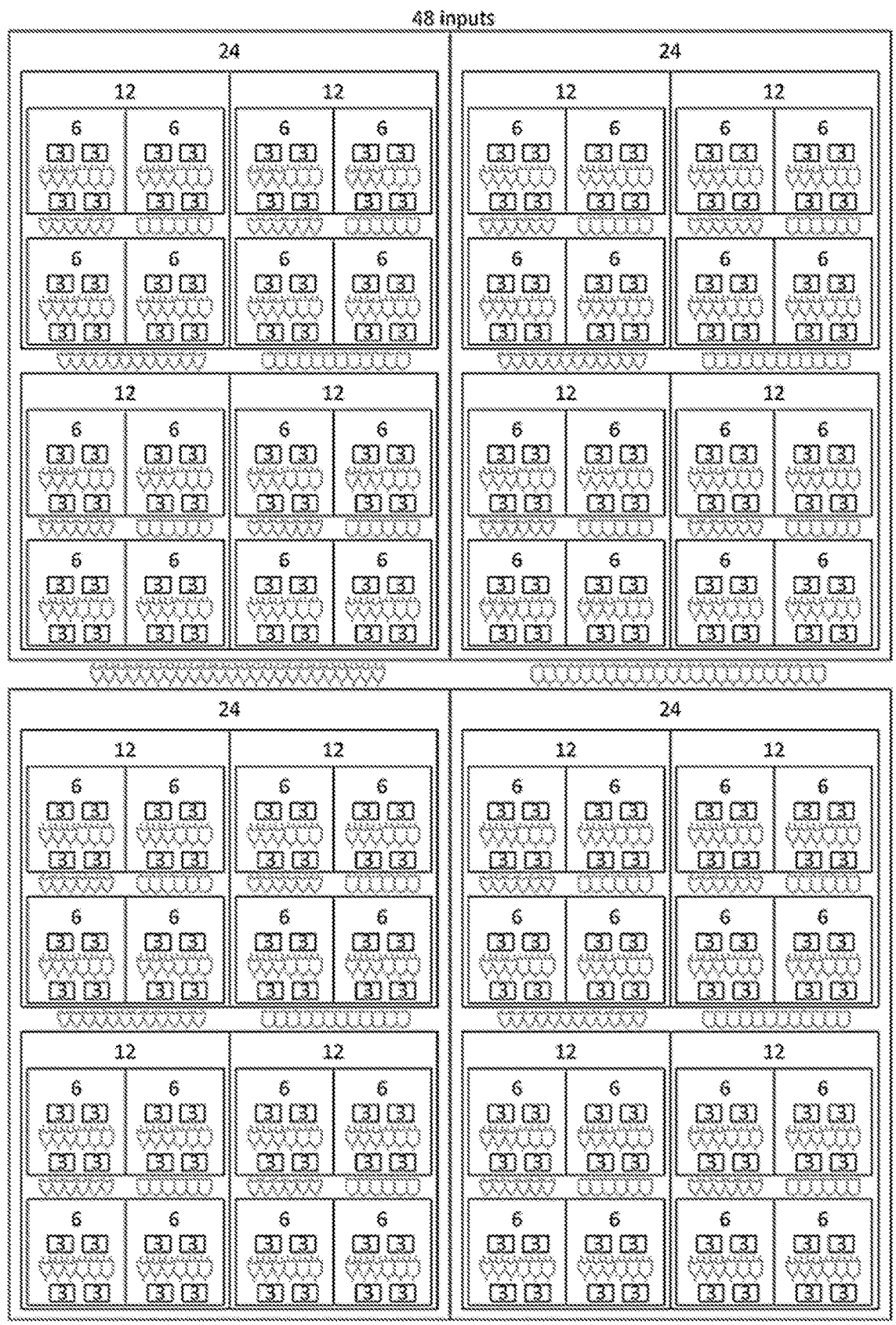
FIG. 9 is a diagram showing an example of a large bit stacker showing a fractal pattern.

We therefore have a circuit that can stack a 2b bit input by using two levels of b-bit stackers and one additional step of logic to form the J and K vectors. Note that when we double the number of bits, the critical path of the circuit doubles as well (as two levels of b-bit stackers are needed) and the actual number of stacker circuits needed grows by a factor of four (as two b-bit stackers are needed to create the H and I vectors and another two are needed to stack the J and K vectors). We can therefore write that the complexity of the stacker circuit in time is $\mathcal{O}(b)$ and in area is $\mathcal{O}(b^2)$ We will now provide a proof that the bit stacking method described here can be used to design a bit stacking circuit for any size input that can be written as three times a power of two. FIG. 9 shows an example of the fractal pattern that emerges from a much bigger bit stacker based on 3-bit primitives.

Symmetric Bit Stacking: Formal Proof

We will now provide a formal proof of the bit stacking method presented in the above section. Consider the operator Pc as defined in Equation 11. Consider a 2b-bit stacker circuit that accepts a vector X of length 2b bits and produces a vector Y of length 2b bits such that Y is a proper bit stack as defined above.

THEOREM 1 (Bit Stacking). The exemplary bit stacking method described in the present disclosure will produce a proper bit stack Y for any input vector X whose length can be written as $3*2^j$ for some j, such that Pc (Y)=Pc(X).

Proof. We can prove by induction. For j=0, we have b=3, and we can verify trivially that a bit stacker can be constructed as in Equation 2, 3, and 4.

Now, assume the bit stacking method described above works for any b-bit input in which $b=3*2^j$. We will prove that for an input size 2 b, the stacking method will produce a proper bit stack, thus demonstrating for an input of size $3*2^{j+1}$.

Consider a 2b-bit input X and call c the number of '1' bits in X, c=Pc(X). Following the process outlined above, divide X into two halves and use two b-bit stackers on each half. Let $X_0, \ldots, X_{b-1}$ be stacked into a b-bitvector called H and $X_b, \ldots, X_{2b-1}$ be stacked into a b-bit vector called I. Let k=Pc(H) and l=Pc(I) as above in Equations 14 and 15. Because we know that both b-bit stackers will produce a proper bit stack, we know that the number of '1' bits will not change:

$$Pc(X)=c=k+l \quad (21)$$

It then follows that:

$$H_i = \begin{cases} 1 & i<k \\ 0 & \text{otherwise} \end{cases} \quad (22)$$

$$I_i = \begin{cases} 1 & i<l \\ 0 & \text{otherwise} \end{cases} \quad (23)$$

Now, construct two new vectors J and K such that (using Boolean OR and AND):

$$J_i = H_{b-i} + I_i \quad i=0, \ldots, b-1 \quad (24)$$

$$K_i = H_{b-i} I_i \quad i=0, \ldots, b-1 \quad (25)$$

We see that $H_{b-i}$ will be '1' when b−i<k or i>b−k. It is also clear that $I_i$ will be '1' when i<l. We can therefore write:

$$J_i = \begin{cases} 1 & i>b-k \text{ or } j<l \\ 0 & \text{otherwise} \end{cases} \quad (26)$$

$$K_i = \begin{cases} 1 & i>b-k \text{ and } j<l \\ 0 & \text{otherwise} \end{cases} \quad (27)$$

Now, consider two cases. Case 1: c<b. We therefore have that k+l<b so l<b−k. We see that if i<l then i<b−k then i>l. Thus, the regions i>b−k and i<l do not overlap, so Pc(J)=k+l=c and Pc(K)=0. In other words, all of the '1' bits will appear in the J vector.

Case 2: c≥b. This means that k+l≥b so we have b−k≤l. In this case, the regions i≥b−k and i<l do overlap. The size of this overlap is l−(b−k)=k+l−b. We see that:

$$Pc(J)=k+l-(k+l-b)=b \quad (28)$$

$$Pc(K)=k+l-b=c-b \quad (29)$$

Namely, the J vector will be completely full of '1's and the remaining '1' bits will appear in the K vector. We can verify:

$$Pc(J)+Pc(K)=b+c-b=c \quad (30)$$

Therefore, the number of '1' bits is unchanged.

We have therefore demonstrated that the J and K vectors contain the same number of '1' bits as X, but all of the J bits will become '1' before any of the K nits become '1'. We will pass both J and K into b-bit stackers, and let Y be the concatenated output of these two stackers.

6:3 Counter: Conversion to Binary Count

We will now use the bit stacking method defined above for b=6 specifically and for general b above to create a 6:3 counter circuit. The 6:3 counter will have six binary inputs $X_0, \ldots, X_5$ and produce three outputs $C_2$, $C_1$, and S such that the binary number $C_2 C_1 S$ is equal to Pc(X), the number of '1's in the input vector X. Clearly, the length of the '1' bits in the bit stack called Y shown above is the count of the number of '1' bits in X. Also, it is clear that we can identify the length of a bit stack by finding the point at which a '1' bit is adjacent to a '0' bit. Given a proper bit stack called S, we can identify a stack of length l by checking $$S_{l-1}\overline{S_l} \quad (31)$$

Furthermore, we can check that the length of the stack of '1' bits in the properly-stacked vector S is bounded by any lenfths x and y such that $$x \leq l < y \quad (32)$$

by checking $$S_{x-1}\overline{S_{y-1}} \quad (33)$$

In order to convert $S_{5:0}$ to a binary count, we need to identify which stack lengths result in each output bit being set. Table 1 shows the minterms which correspond to each case in which the output bits $C_2C_1S$ should be set.

TABLE 1

Minterms of Binary Output for 6-bit Counter

| $S_{5:0}$ | $C_1C_0S$ | $C_2$ minterms | $C\_1$ minterms | $S$ minterms |
|---|---|---|---|---|
| 000000 | 000 | | | |
| 000001 | 001 | | | $\overline{S}_1 S_0$ |
| 000011 | 010 | | $\overline{S}_3 S_1$ | |
| 000111 | 011 | | | $\overline{S}_3 S_2$ |
| 001111 | 100 | $S_3$ | | |
| 011111 | 101 | | | $\overline{S}_5 S_4$ |
| 111111 | 110 | | $S_5$ | |

For the least significant bit S we check for stacks of lengths 1, 3, or 5. For the next bit C1, we check for stacks of length at least 2 but no more than 3 or stacks of length 6. And finally for the most significant bit C2, we check for any stacks of at least length 4, with no upper restriction on the length. Therefore, the expressions for the outputs of the 6 bit counter are $$S = \overline{S}_1 S_0 + \overline{S}_3 S_2 + \overline{S}_5 S_4 \quad (34)$$

$$C_1 = \overline{S}_3 S_1 + S_5 \quad (35)$$

$$C_2 = S_3 \quad (36)$$

Figure 10:
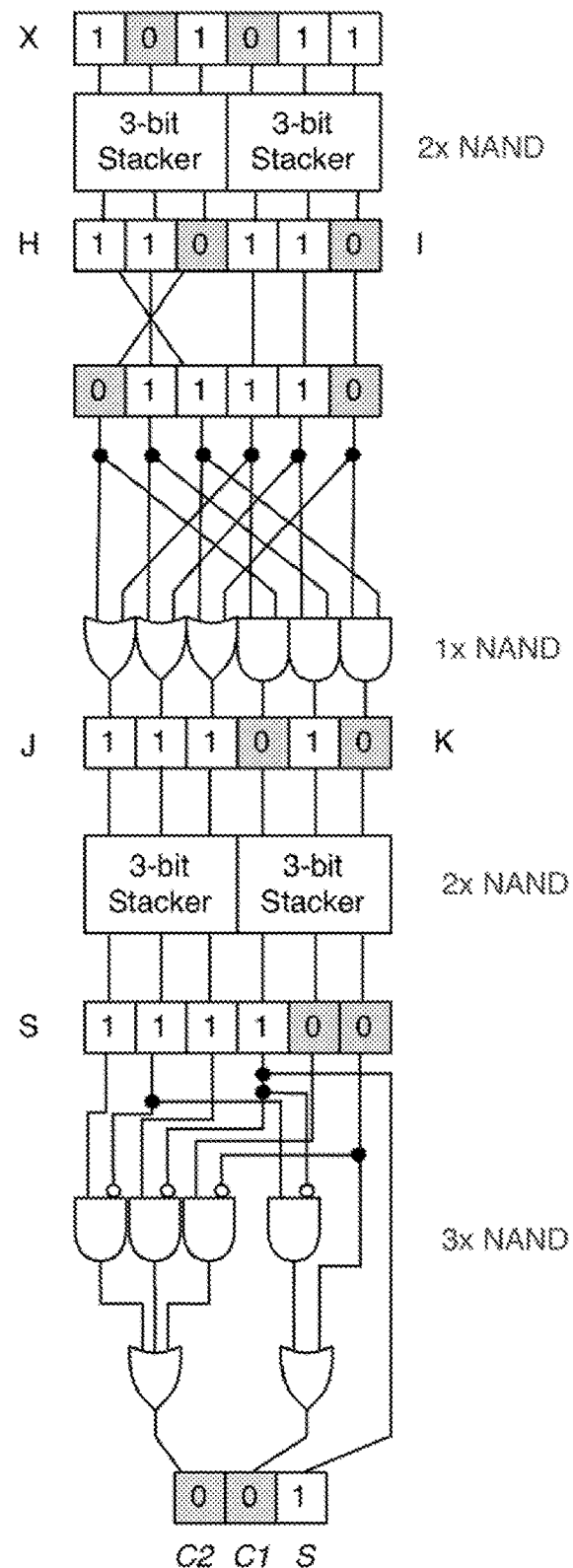
FIG. 10 is a diagram of a stacker based 6:3 counter.

The full schematic for the stacker-based 6:3 counter is shown in FIG. 10.

Analyzing the critical path delay, we see that the presently-disclosed counter uses no XOR gates or multiplexers. The critical path delay is through 8 equivalent NAND gates. This is because the actual CMOS implementation of each 3-bit stacker uses a single large gate to compute each output.

This implementation style produces the complement outputs of each signal from the 3-bit Stackers. This is beneficial as it allows the J and K vectors to be computed using NAND and NOR gates which are the simplest to implement. For example, rewriting Equation 5 to compute $J_0$ and rewriting Equation 8 to rewrite $K_0$ in terms of the complement outputs from the 3-bit Stackers:

$$J_0 = H_2 + I_0 = \overline{\overline{H}_2 \overline{I}_0} \quad (37)$$

$$K_0 = H_2 I_0 = \overline{\overline{H}_2 + \overline{I}_0} \quad (38)$$

The presently-disclosed 6:3 counter has a critical path delay through 8 equivalent NAND gates, $8T_{NAND}$. As discussed, we can conservatively take $$T_{XOR} = 3T_{NAND} \quad (39)$$

This means that the critical path delay of the parallel 7:3 counter is $10T_{NAND}$. Thus, this first iteration of a 6:3 binary counter based on symmetric stacking reduces the critical path delay by at least $2T_{NAND}$. This is a promising result, but enhancements can be made to derive the counts more quickly, as discussed below. 6:3 COUNTER:ENHANCED VERSION: Converting Bit Stack to Binary Number In order to implement a 6:3 counter circuit, the 6-bit stack described above must be converted to a binary number. For a faster, more efficient count, we can use intermediate values H, I, and K to quickly compute each output bit without needing the bottom layer of stackers. Call the output bits $C_2$, $C_1$, and S in which $C_2C_1S$ is the binary representation of the number of '1' input bits. By making use of the H and I stacks we can quickly determine the outputs without needing the bottom layer of stackers.

To compute S, we note that we can easily determine the parity of the outputs from the first layer of 3-bit stackers. Even parity occurs in the H if zero or two '1' bits appear in $X_0$, $X_1$ and $X_2$. Thus, $H_e$ and $I_e$, which indicate even parity in the H and I bits, are given by $$H_e = \overline{H}_0 + H_1 \overline{H}_2 \quad (40)$$

$$I_e = \overline{I}_0 + I_1 \overline{I}_2 \quad (41)$$

As S indicates odd parity over all of the input bits, and because the sum of two numbers with different parity is odd, we can compute $B_0$ as $$S = H_e \oplus I_e \quad (42)$$

Although this does incur one XOR gate delay, it is not on the critical path.

TABLE 2

BINARY COUNTS FOR $C_1$

| Count | $C_2$ | $C_1$ | S |
|---|---|---|---|
| 1 | 0 | 0 | 1 |
| 2 | 0 | 1 | 0 |
| 3 | 0 | 1 | 1 |
| 4 | 1 | 0 | 0 |
| 5 | 1 | 0 | 1 |
| 6 | 1 | 1 | 0 |

Table 2 presents the correct outputs in binary for each count, in which bold rows indicate cases for which $C_1$ should be '1'. To compute $C_1$, we notice from Table 1 that we need to check for two cases. First, we need to check if we have at least two but no more than three total inputs. We can use the intermediate H, I, and K vectors for this. To check for at least two inputs we need to see stacks of length two from either top level stacker, or two stacks of length one, which yields $H_1 + I_1 + H_0 I_0$. In other words, to check for at least two inputs, we need to check if at least one of the H bits and one of the I bits are set, or if two of either are set. To check that we do not have more than three inputs set, we simply need to make sure that none of the K bits are set as the K vector is only set when more than three inputs are '1', as discussed above. This gives $\overline{(K_0 + K_1 + K_2)}$.

Second, we need to check if we have all 6 inputs as '1'. We can check this by checking that all three of both the H and I bits are set. As these are bit stacks, we simply check the rightmost bit in the stack for this case, which yields $H_2 I_2$. Altogether, this yields:

$$C_1 = (H_1 + I_1 + H_0 I_0)\overline{(K_0 + K_1 + K_2)} + H_2 I_2 \quad (43)$$

We can easily calculate $C_2$ as it should be set whenever we have at least 4 bits set:

$$C_2 = K_0 + K_1 + K_2 \quad (44)$$

Figure 4:
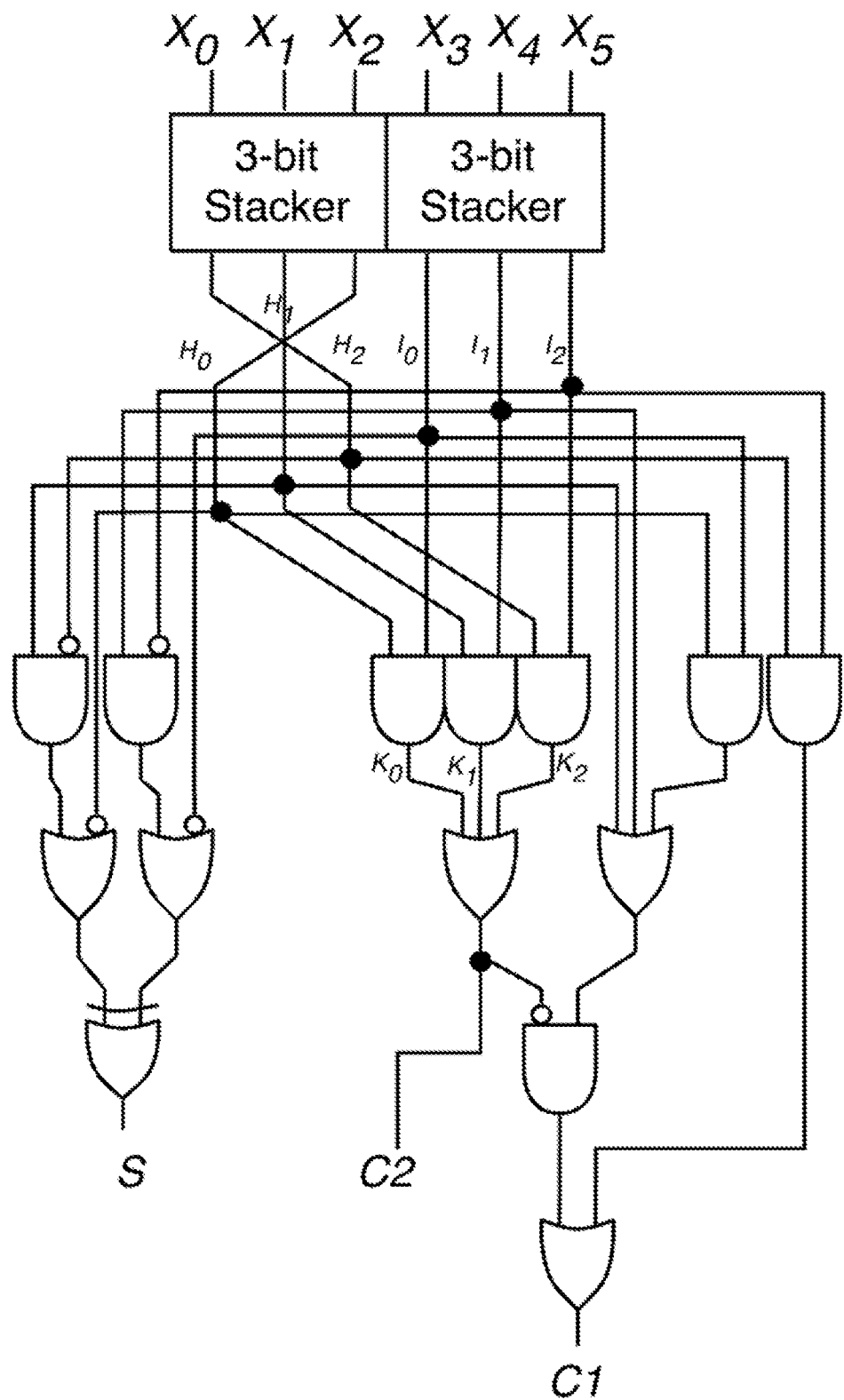
FIG. 4 is a 6:3 counter based on symmetric stacking according to another embodiment of the present disclosure.

Using equations 42, 43, and 44, the final 6:3 counter circuit can be constructed as shown in FIG. 4.

The AND and OR gates can be implemented using NAND and NOR logic to reduce the critical path to $7T_{NAND}$. As there are no XOR gates on the critical path, this 6:3 counter outperforms existing designs as shown in the next section. 6:3 Counter Simulation The presently-disclosed 6:3 counter design was built as a standard CMOS design and simulated using Spectre, using the ON Semiconductor C5 process (formerly AMI06). For comparison, a previous 6:3 counter design was implemented using standard CMOS full adders similar to FIG. 1. A parallel counter design known in the art was converted to a 6:3 Counter and simulated as well. It has a critical path delay of $3\Delta_{XOR}+2$ basic gates. A mux-based counter design was also simulated. It has a critical path delay of $1\Delta_{XOR}+3\Delta_{MUX}$. Two of the muxes on the crucial path can be implemented with transmission gate logic which is slightly faster. The presently-disclosed 6:3 Counter has no XOR gates or muxes on its critical path. It has a critical path delay of seven basic gates.

Table 3 shows the results of the simulation of these four 6:3 counter implementations in terms of latency, average power consumption, and number of transistors used. For the presently-disclosed counter, these results are for the entire counter including the 3-bit Stacker circuits and binary conversion logic. The transistor count is output in the Circuit Inventory in the Spectre output as a node count. The simulation was run at 50 MHz.

TABLE 3

6:3 COUNTER SIMULATION RESULTS

| Design | Gate Delays ($T_{NAND}$) | Latency (ns) | Avg. Power (μW) | Transistors |
|---|---|---|---|---|
| CMOS full adder based | 15 | 3.1 | 270 | 162 |
| Parallel Counter [4, 5] | 10 | 2.3 | 181 | 158 |
| Mux-Based [6] | 9 | 1.8 | 268 | 112 |
| Present Design | 7 | 1.4 | 146 | 120 |

Note that for the mux-based counter design we can take the propagation delay for a mux as $2T_{NAND}$ which follows from the standard implementation of a mux and is also verified by simulation.

Because the presently-disclosed 6:3 counter based on bit stacking has no XOR gates on its critical path, it operates 30% faster and consumes at least 20% less power than all other counter designs. Additionally, the presently-disclosed counter has less wiring complexity in that it uses fewer internal subnets than all other simulated designs. Thus, this method of counting via bit stacking allows construction of a counter for a substantial performance increase at a reduction in power consumption.

Figure 11:
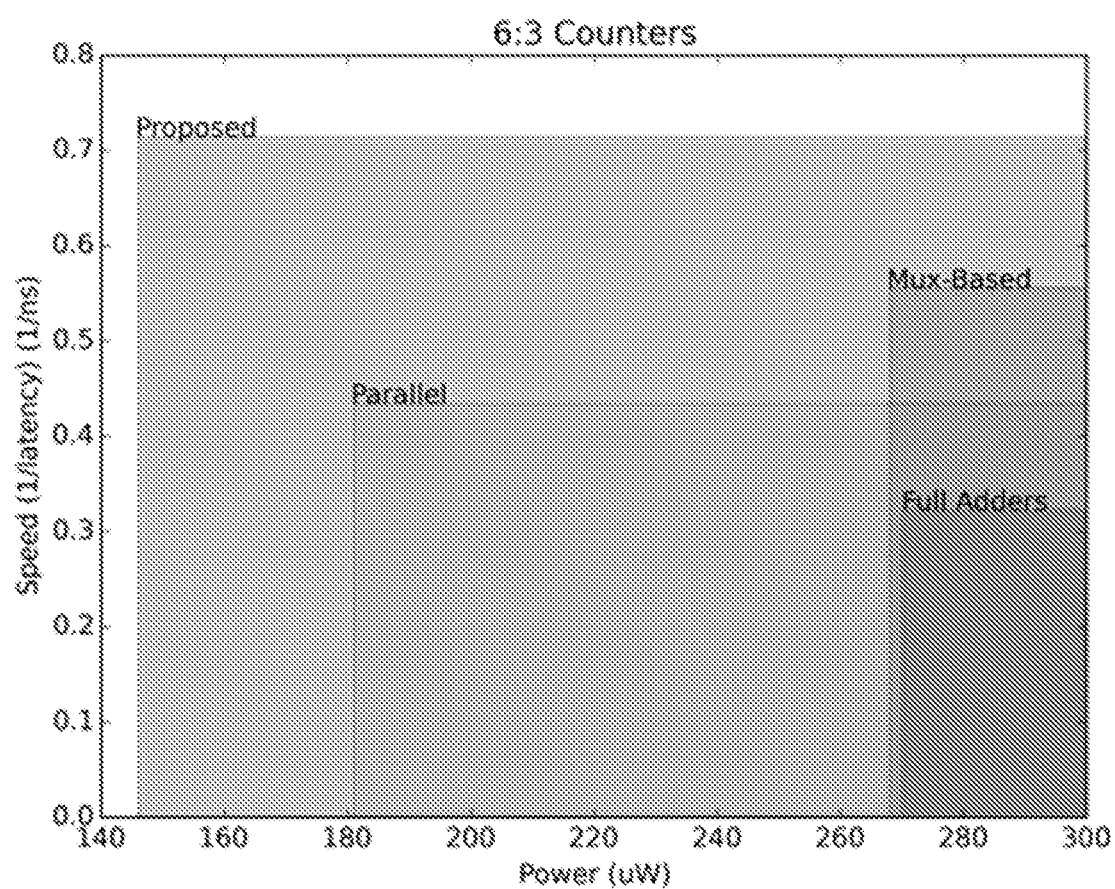
FIG. 11 is a chart showing 6:3 counter simulation results.
Figure 12:
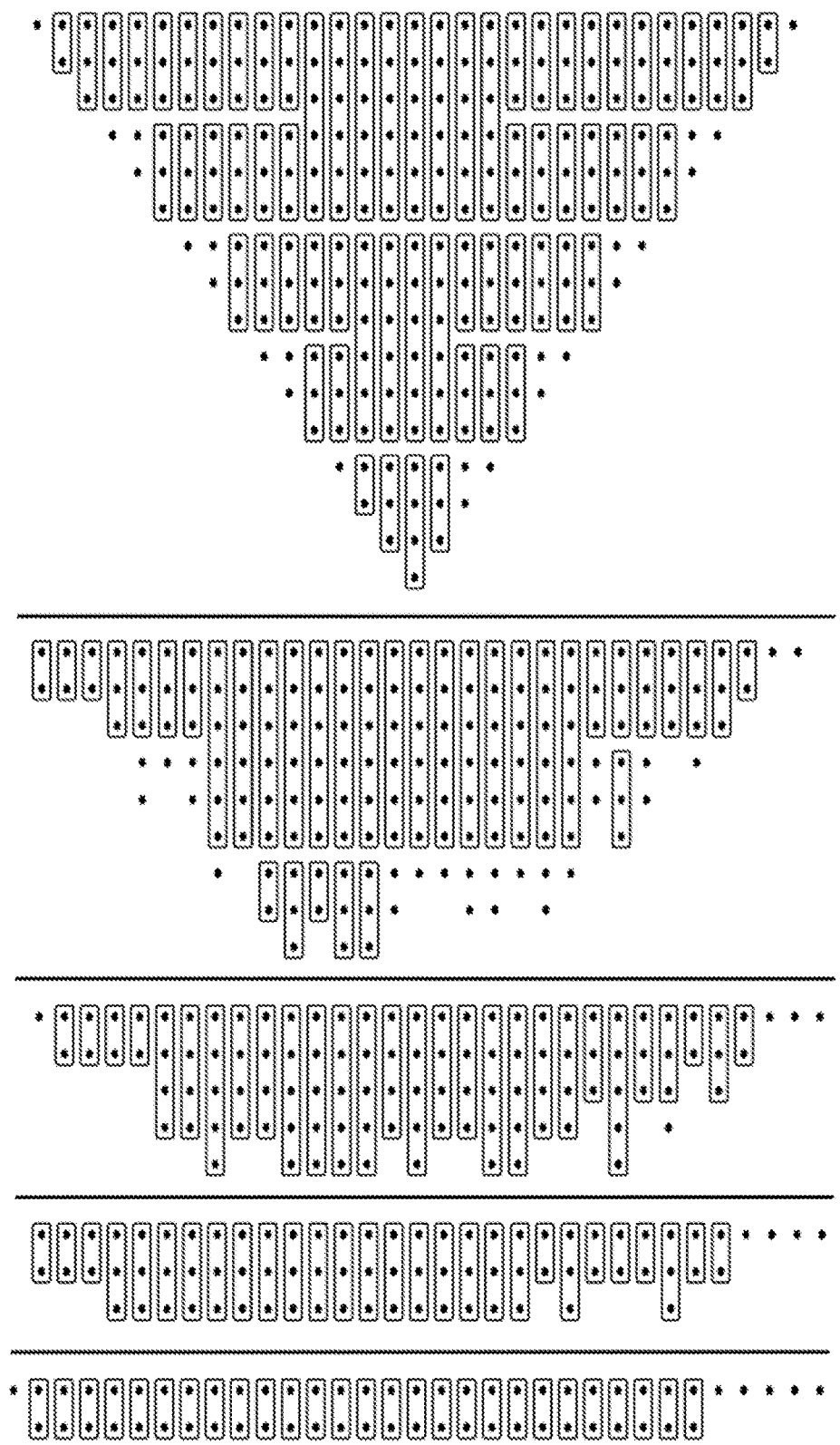
FIG. 12 shows CBW reduction for b=16 using 6:3 counters.

FIG. 11 illustrates the relative placement of the simulated counter designs in terms of latency and power consumption. We note that because the presently-disclosed 6:3 Counter represents a pure gain in terms of higher speed for less power (and fewer transistors as well), all of the other counter designs are enclosed in the box corresponding to the presently-disclosed counter in FIG. 11.

7:3 Counter Design

The present symmetric stacking method can be used to create a 7:3 Counter as well. 7:3 Counters are desirable as they provide a higher compression ratio—the highest compression ratio for counters that output three bits. The design of the 7:3 Counter involves computing outputs for $C_1$ and $C_2$ assuming both the cases where $X_6=0$ (which matches the 6:3 Counter) and assuming $X_6=1$. We compute the S output by adding one additional XOR gate as this will again not be on the critical path.

To compute $C_1$ if $X_6=0$, we use the same process as before in the 6:3 counter. If $X_6=1$, then everything will shift up as shown in Table 4. The output will be '1' if we have at least one but less than three of $X_0, \ldots, X_5$ as a '1' or if ve of these inputs are '1'. This is because $X_6$ will add one more to the count causing the same case as before.

$$S=S^*\oplus X_6 \qquad (45)$$

TABLE 4

Output Counts for $C_1$ for 7:3 Counters if $X_6 = 1$

| Count | $C_2C_1S$ |
|---|---|
| 0 | 000 |
| 1 | 001 |
| 2 | 010 |
| 3 | 011 |
| 4 | 100 |
| 5 | 101 |
| 6 | 110 |
| 7 | 111 |

If $X_6=1$, then $C_1=1$ if the count of $X_0, \ldots, X_5$ is at least 1 but less than 3 or 5, which can be computed as $$C_1=(H_0+I_0)\overline{J_0J_1J_2}+H_2I_1+H_1I_2 \qquad (46)$$

Also, $C_2=1$ if the count of $X_0, \ldots, X_5$ is at least 3 (given the assumption that $X_6=1$):

$$C_2=J_0J_1J_2 \qquad (47)$$

Figure 5:
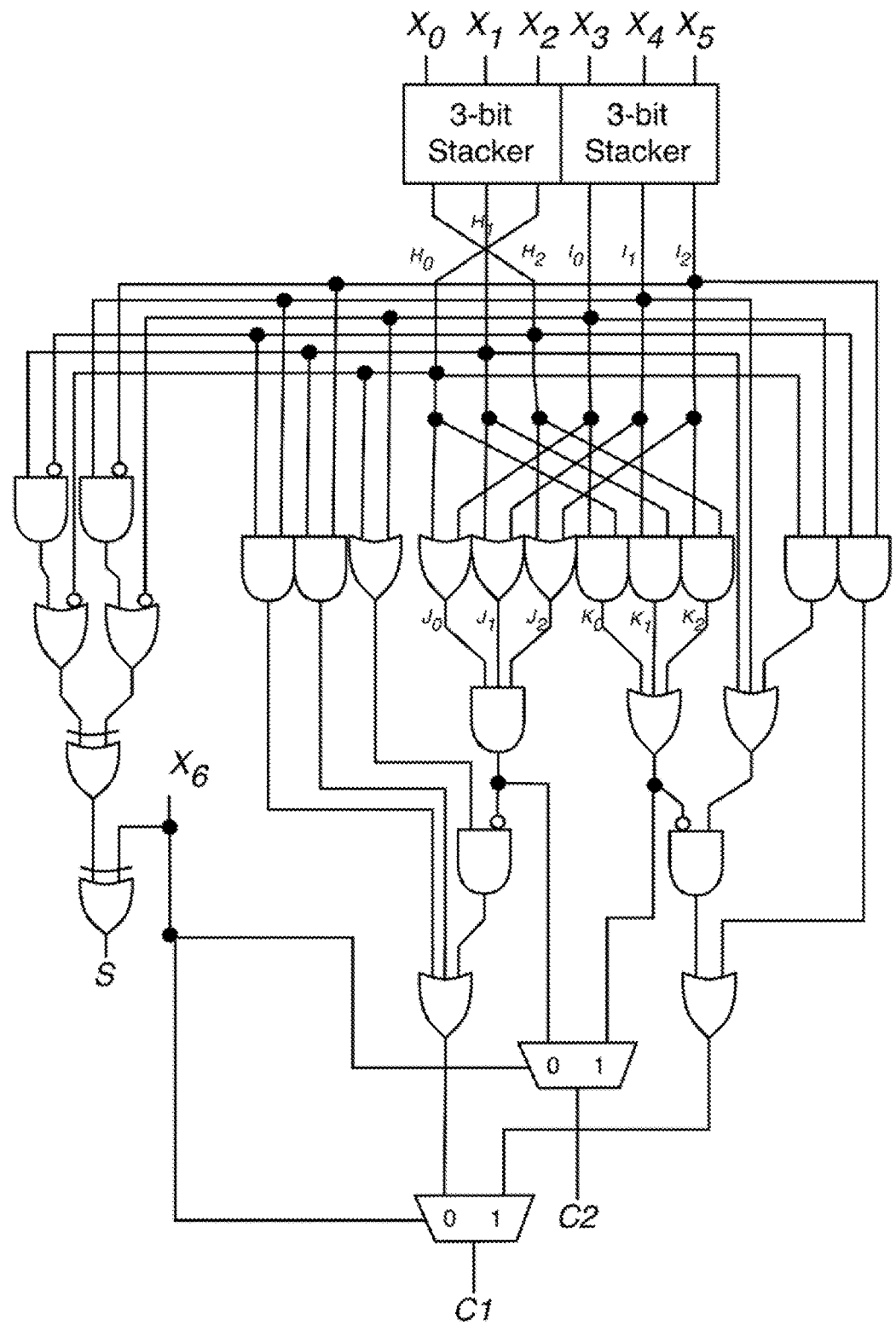
FIG. 5 is a 7:3 counter based on symmetric stacking according to another embodiment of the present disclosure.

Both versions of $C_1$ and $C_2$ are computed and a mux is used to select the correct version based on $X_6$. The 7:3 Counter design is shown in FIG. 5.

Simulations were run on the presently-disclosed 7:3 Counter against the original 7:3 Counters. The results are shown in Table 5.

TABLE 5

7:3 COUNTER SIMULATION RESULTS

| Design | Latency (ns) | Avg. Power (μW) |
|---|---|---|
| CMOS full adders | 3.1 | 350 |
| Parallel Counter [4, 5] | 2.2 | 266 |
| Mux-Based [6] | 2.1 | 402 |
| Present Design | 1.8 | 282 |

We compute both possible values for $C_2$ and $C_1$ and then use a 2:1 multiplexer to select the correct output based on $X_6$. While still efficient, this design has added one expensive XOR gate and two expensive multiplexers and is therefore not as optimized as our 6:3 Counter. Nevertheless, we will see that it performs better than existing 7:3 Counters albeit by a smaller margin. FIG. 10 shows the implementation schematic for this 7:3 Stacker Based Counter design.

The same simulation setup is used to test this 7:3 Counter against both the parallel 7:3 Counter and the mux-based 7:3 counter. The results of this simulation are shown in Table 5.

While the presently-disclosed counter is still slightly faster than the existing counters, the improvement is not as significant. For this reason, we will use the presently-disclosed 6:3 Counter to build 64-bit multipliers in the sections below even though this requires one more reduction phase.

Counter-Based Wallace Tree Multiplier Design

To evaluate the merit of the presently-disclosed counters we construct 64-bit Counter Based Wallace Tree Multipliers built using our counters as well as the reference counters and measure their performance in terms of latency, average power consumption, and number of transistors. The design process for a CBW multiplier involves an iterative design algorithm which starts by assigning reductions to 3:2 Counters only. It then replaces these counters one by one with 7:3, 6:3, 5:3, and 4:3 Counters whenever the number of rows in the next phase violates given parameters. This process helps keep the cost of the total multiplier to a minimum as 3:2

Counters are cheap and efficient, while still achieving the minimum number of reduction phases.

In this section we will discuss the design implementation of CBW multipliers. The process involves using a Python module to generate VHDL code for each desired multiplier design, then using Cadence Virtuoso to import the VHDL into a schematic for simulation with Spectre. As discussed above, the presently-disclosed 6:3 Counters are highly efficient. However, using no counters bigger than 6:3 Counters requires one extra reduction phase. We will implement Counter Based Wallace Tree multipliers using our 6:3 Counters rst, and compare to multipliers built using the 7:3 Counters from the literature. We will see that despite requiring one extra reduction phase, our counters still produce multipliers that are faster and more efficient than any other in terms of power-delay product.

In order to construct various Counter Based Multiplier circuits, a software algorithm was developed, with extra parameters to handle different internal counter implementations and sizes. This algorithm was developed in Python and can be used to generate VHDL code for many variations of Counter Based Wallace multipliers. The basic implementation can be used to build a generic Wallace Tree which only uses full and half adders (3:2 and 2:2 Counters). Extra parameters allow construction of the Counter Based multipliers using different internal counter sizes. After generating the multiplier design as a VHDL module, this module can be read in to Cadence Virtuoso design suite to actually construct the multiplier for simulation. As discussed, the overall goal is to create various multiplier circuits to simulate and compare that use the same architecture and topology and differ only in the internal counters used. In this way, we can demonstrate the effect of the stacker-based counters. In this section, the software algorithm will be detailed, followed by a discussion on the actual implementation of the output in Virtuoso.

First, we consider:

Equations (48), (49), and (50). These expressions can be used to calculate the number of remaining partial sums (rows) after applying one phase of binary counters to each column. The equations take $R_i$ as input which gives the maximum number of rows in any column in phase i. The assumption is that binary counters of sizes 7:3, 6:3, 5:3, and 4:3 along with standard full and half adders are available for use in each reduction phase. These expressions can be modified to:

$$R_{i+1} = 3 \times \frac{R_i}{6} + S + C_1 + C_2 \quad (48)$$

$$C_1 = \begin{cases} 0 & R_i \bmod 6 \leq 1 \\ 0 & \text{otherwise} \end{cases} \quad (49)$$

$$C_2 = \begin{cases} 1 & R_i \bmod 6 \leq 4 \\ 0 & \text{otherwise} \end{cases} \quad (50)$$

to give the number of resulting rows if the largest size counter is 6:3, which will be relevant when using the presently-disclosed stacker-based counters as the 6:3 variants are the highest performing. These equations give upper bounds on the number of allowable rows after applying compression, and will therefore be used in the software algorithm to limit the output rows and try higher compression while these constraints are not met. These equations can be understood as follows: if the largest counter type used is 7:3, then every group of 7 rows at phase i will become 3 rows in phase i+1. However, if the number of rows at phase i is not a multiple of 7, then some rows will not be handled by 7:3 Counters and will experience a lower compression ratio. If the maximum number of rows at phase i is not a multiple of 7, then one additional element will remain in at least one column increasing the number of output rows by 1. If the number of rows at phase i is 7k+2 or 7k+3 for some k, then a full adder can be used to compress these remaining rows, but this full adder will generate an additional output of higher weight which will carry to the next column. This additional carry will ultimately cause an extra row to remain. If the maximum number of rows is 7k+l for l>3, then a higher counter will have to be used for compression which will generate bits in the next two columns, thus increasing the number of total rows by one again.

The parameterized software algorithm developed here takes the multiplier size in bits and the maximum counter size to use as arguments. This software algorithm follows four phases: In the first phase, partial products are generated. In the second phase, reduction is applied using binary counters up to the maximum allowable size, until two 2b bit numbers result. In the third phase, a simple ripple-carry adder structure is generated to add the final two numbers and return the product. In the final phase, each signal and each component is converted to a VHDL string and the code is output into a VHD file.

In the first phase, a list of signals and a list of components is initialized. The components are defined as types including simple AND gates as well as counters of every size from 2 to 7 bit inputs. These component definitions will be used to form strings representing actual VHDL code that instantiates the corresponding component in the final phase. The first step of developing the multiplier design is to instantiate AND gates to perform the bitwise multiplications. For a b·b bit multiplier, this results in $b^2$ AND gates forming b partial products that are all b bits long. Thus, $b^2$ signals and $b^2$ AND gate components are created and added to the corresponding lists. The signals are named numerically but including a suffix indicating from which phase of reduction they are generated. All of the signals that are driven by AND gates are taken to be from phase 0.

The next step is to carry out the actual reduction. The reduction process is carried out one column at a time, generating the signals that will carry on to column i going in to the next phase. The general shape of the bits in all partial products can be compressed to the standard triangular shape. This means that after phase 0, the maximum number of rows in any column is b, and there are 2b columns total. Equations (48)-(50) for maximum counter size of 7, or Equations (48)-(50) for maximum counter size of 6 give a maximum on the resulting number of rows after one reduction phase. The algorithm starts from the rightmost column and begins by assigning full adders only. The goal is to start with smaller counters and only apply larger ones when needed to reduce the number of time and power expensive large counter circuits. If the number of rows in column j from phase i is $R_j$, then $R_j$=3 full adders are instantiated to cover the first 3k entries in this column for $3k<R_j$. One or two elements might remain in each column after this process. Note that for each full adder used, one bit is generated for the current row meaning that every three bits are replaced by one bit. However, one bit is also carried over to the next row. This means that when the algorithm visits any column i, the constraints given in the above equations must include not just the bits resulting from the counters created for column i but also possibly from columns i−1 and also i−2 as we will discuss next.

After creating as many full adders as needed for this column, the algorithm then checks the resulting number of rows for the next phase in both column i and i+1, including outputs from adders in this column and possibly also from previous columns as well. If the number of resulting rows in either column exceeds the constraints given in the constraint equations above, higher order compression is needed so the algorithm cannot move on to the next column yet. Column i+1 must be considered as well as it is possible that the compression done in column i will cause the number of rows in column i for the next phase to be under the limit, but cause the number of rows in the next phase for column i+1 to be too high based on the carry signals. If the number of resulting rows in the next column is already too high, the algorithm will never be able to succeed at reducing the next column below the limit. Higher compression is applied as follows: first, all of the full adders in this column are removed, returning the original number of bits for this column but also removing all carry bits that spilled into the next column. Next, the biggest allowable counter is used which is 7 for the reference cases and 6 for cases using our design. Note that the counter selected will not always be the largest allowable but the largest allowable counter that will fit in the number of rows that need to be compressed in this column. Exactly one higher order counter (of 4 to 7 inputs) is instantiated for each attempt. The remaining rows are again compressed with full adders with the same goal of reducing the overall size and power expense. Higher order counters generate three outputs, one in column i, one in column i+1, and one in column i+2. After applying one higher order counter, again the size of columns i and i+1 in the next phase are checked against the constraint. If the size of either column still exceeds the maximum, again all of the full adders are removed (the larger counters are kept) and one more larger counter is applied, again the largest that will t in the remaining rows up to the maximum allowable size. After repeating this process, eventually the size of the columns for the next reduction phase will be less than the constraints given in the above equations and the algorithm will move on to the next column.

We will discuss an example of the reduction process given a column i which has 16 rows from the previous phase, allowing for up to 7:3 Counter sizes to be used. We will assume that 16 is the maximum size of any column, so the constraint equations gives that after one reduction phase, no more than 8 rows should result. Let us assume that there are 3 carry signals from columns to the right already in column i for the next phase. First, 5 full adders are allocated, meaning that column i will have 5 signals in the next phase. Also, the 16th signal in this column could not be included in the five full adders, and 3 signals were already present from other carries. This results in 9 signals in this column which exceeds the limit. The full adders are removed and one 7:3 counter is used instead, along with 3 more full adders covering the 16 signals exactly. Now this column in the next phase will have one signal from the 7:3 counter, three signals from the full adders, and three signals from the existing carries giving 7 signals total which is under the limit.

The next phase of the algorithm is to actually construct the output as proper VHDL code. Note that the code that can be read by Cadence must be purely structural (containing only module instantiations, no behavioral description), and must only make use of components that are previously de ned in the same Cadence library. These sub components should already have schematics de ned at the transistor level. We will use a standard AND gate implementation in the Cadence library, along with the following existing counter designs for different multiplier outputs: The parallel, mux-based, and standard CMOS 7:3 counters, the parallel, mix-based, standard CMOS, and presently-disclosed stacker-based 6:3 counters, and the 5:3 and 4:3 counters. Standard designs are used for full and half adders. Program parameters select which internal counters are applied for each multiplier circuit. An appropriate VHDL entity description is added based on a parameterizable module name which also includes the multiplier size. Then, component declarations are included for the AND gates and each counter type used. After this, for each signal in the list of generated signals, a signal declaration is included. Finally, all of the instantiated components are included with port maps that assign their inputs and outputs based on the object elds in the Python classes for each component type. The result is a fully valid VHDL module based on any counter design for any size. The output VHDL code is not included as it often contains tens of thousands of lines, but can easily be generated by running the script.

Figure 13:
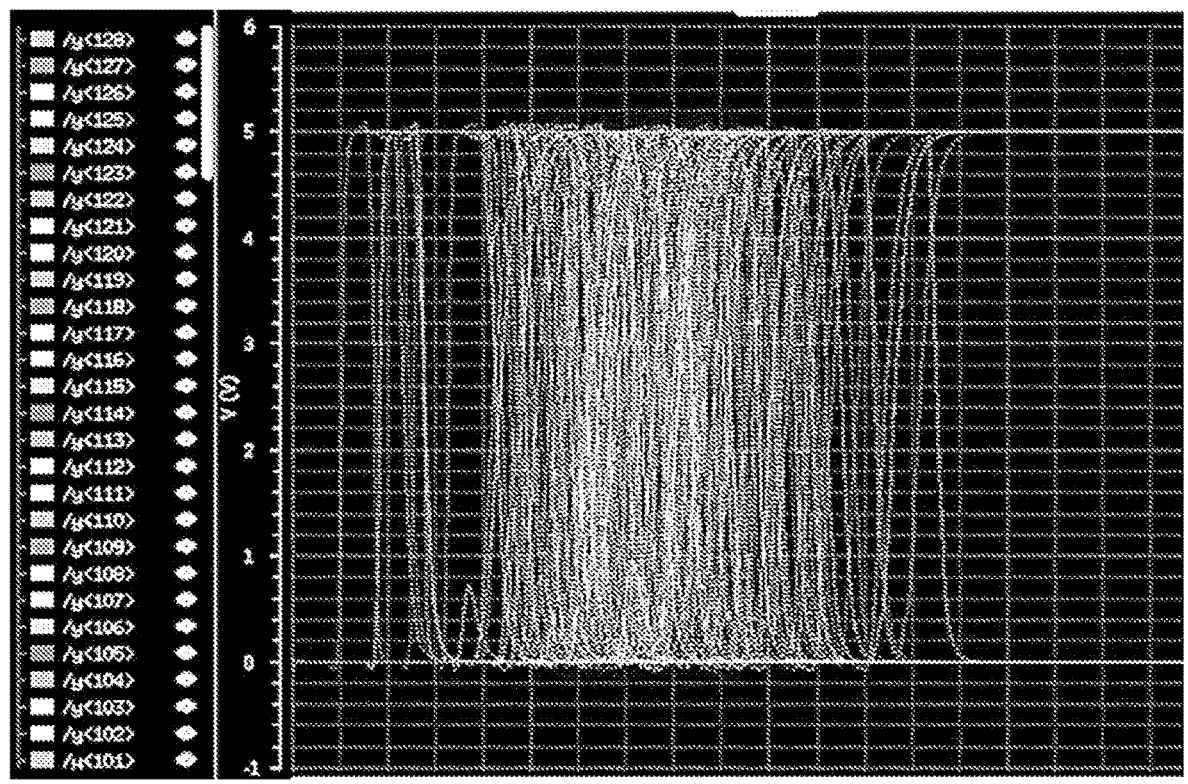
FIG. 13 shows an example of CBW outputd transitioning for one test case.

An example of this implementation for b=16 is included in FIG. 13: bits that are grouped are input to a counter of the corresponding size. This figure illustrates the process when using up to 6:3 counters. If 7:3 counters are used as well, circuit becomes a dot diagram which is not reproduced here.

Simulation Setup and Results for CBW Multipliers

We will first discuss the Cadence Virtuoso and Spectre simulator setup used to evaluate various Counter-Based Wallace multipliers of different sizes. Using the above software algorithm, VHDL code was generated for four CBW multipliers were generated for each size. For each b·b bit multiplier for various values of b, first, a standard Wallace Tree was generated, which uses only full and half adders and reduces no more than three rows in any one reduction phase. Next, two counter based multipliers were generated using higher order counters up to 7 bits. One of these multipliers uses a parallel counter of a previous design for all of the 7:3 and 6:3 counters, while the other uses the mux-based counters another previous design. In both cases, counters of smaller sizes (5:3, 4:3, and full and half adders) were implemented using standard designs. Lastly, for each size, a CBW multiplier was generated using the presently-disclosed 6:3 stacker-based couneedters. In these cases, the maximum counter size used was 6:3 and no 7:3 counters were used. This generally results in at least one more reduction phase as discussed. However, because the performance of our 6:3 counter is high and the stacking method does not apply as well to 7:3 counters, we accept the extra reduction phase and will show that the performance achieved by multipliers using the stacker-based counters is higher than any other design and also consumes less power. In most cases it is also smaller in area.

The four multiplier circuits were generated for each of the different test sizes: 8, 16, 32, 64, and 128-bit multipliers. These test cases cover nearly all of the commonly used multiplier sizes in general purpose computing. Multipliers taking 64 bit operands are frequently used in modem computational units. Applications for larger multipliers of 128 bits or more are in cryptology. While the simulation tools used do not readily allow us to simulate multiplier circuits larger than 128 bits, we will conclude based on the performance characteristics of the sizes we simulated that the performance benefit of using the stacker-based counter will scale for any size circuit. Cadence Virtuoso can directly import VHDL code into a schematic for simulation with Spectre. This is necessary as the 64 and 128-bit designs have hundreds of thousands of transistors. As discussed in herein, the internal counters that will be used by each of the large CBW multipliers already exist in the same Virtuoso environment and are directly instantiated by the import process. Several additional components are necessary, such as AND gates, half and full adders, 4:3 and 5:3 counters. These are all implemented using previous designs. Once the multiplier module is imported, the schematic is given a power supply and ground connection and is extracted to form the netlist for the Spectre simulator. The multiplier circuits simulated are run purely asynchronously with no internal registers or pipelining. This is the common method of presenting multipliers in the literature. It is important to note that there is nothing in the design that prevents pipelining-registers could be inserted after each reduction phase to allow multiple inputs to be processed in parallel. Indeed, the multiplier architectures simulated here are standard Counter Based Wallace designs and can therefore be used in any way a standard multiplier is used. We are merely changing the internal counter to produce benefit to the whole design and demonstrate a use case of the presently-disclosed counter.

The Spectre simulator is an industry standard tool used for circuit elaboration and simulation. Many different simulation types are available, but a simple transient analysis is sufficient for measuring the latency and power consumption of the CBW multiplier circuits in this work. The Virtuoso Analog Design Environment interface allows configuration of the simulation type, stimuli, outputs, and models. As discussed, the technology used is the AMI06N (MOSIS Semiconductor) process. The simulation is run at 5V, 27 degrees C., 50 MHz, for 500 ns with different test cases. The test cases used are randomly generated. Because of the size of the circuits being simulated, the test cases used were generated with a second Python script. For a b-bit multiplier, two vectors of b-bit numbers were randomly generated. Each pair of numbers was converted into Virtuosos stimulus input format as bit strings. For each input signal $A_i$ and $B_i$ for i from 0 to b−1 in both multiplier inputs A and B, a string of bits was generated from the ith position of each random input for A and B. The same input stimulus patterns were used for all four test multiplier cases for each size. Lastly, the VDD stimulus was set as 5V. Before executing the simulation, the 2b outputs from the circuit were selected as outputs. Additionally, the Spectre option to save all of the power outputs was selected as well. This option allows analysis and display of the power consumption of every submodule (down to the transistor level) in the design. We will use the total power consumption in the following analysis.

Particularly for the larger circuits of 64 and 128-bit input sizes, the simulations are very computationally intensive even for the 500 ns runtimes. Cadence and Spectre running on a personal computer are unable to complete simulations for the largest circuits due to excessive memory usage. Therefore, computer space used on the 32-core Metallica server in the UB Computer Science department. This server is dedicated for long running, CPU intensive applications that do not need interaction. The average runtime over the four multipliers run for each input size is given in Table 6. For smaller circuits of 8 and 16 bits, the simulation completes in a matter of minutes. For 32 bits, the simulation completes in less than an hour. 64 bit simulations take up to 2 hours. However 128 bit simulations take up to 20 hours. As we will verify when discussing the simulation results, the size of a multiplier circuit grows quadratically with the number of input bits. This is intuitive as discussed in the introduction to this work: every possible pair of input bits is AND-ed together forming $b^2$ product bits arranged as a b partial products each b bits long. However, the runtime grew much higher than quadratically for the 128 bit simulation case as compared to the smaller circuits, suggesting perhaps that a memory threshold is crossed causing much more disk swapping. In general, the 128-bit bit simulations consumed up to 7 GB of RAM in peak usage.

TABLE 6

Average Simulation Runtimes for Different Size CBW Multipliers

| b | Average Runtime (min) |
|---|---|
| 8 | 0.5 |
| 16 | 1 |
| 32 | 11 |
| 64 | 95 |
| 128 | 1320 |

Figure 14:
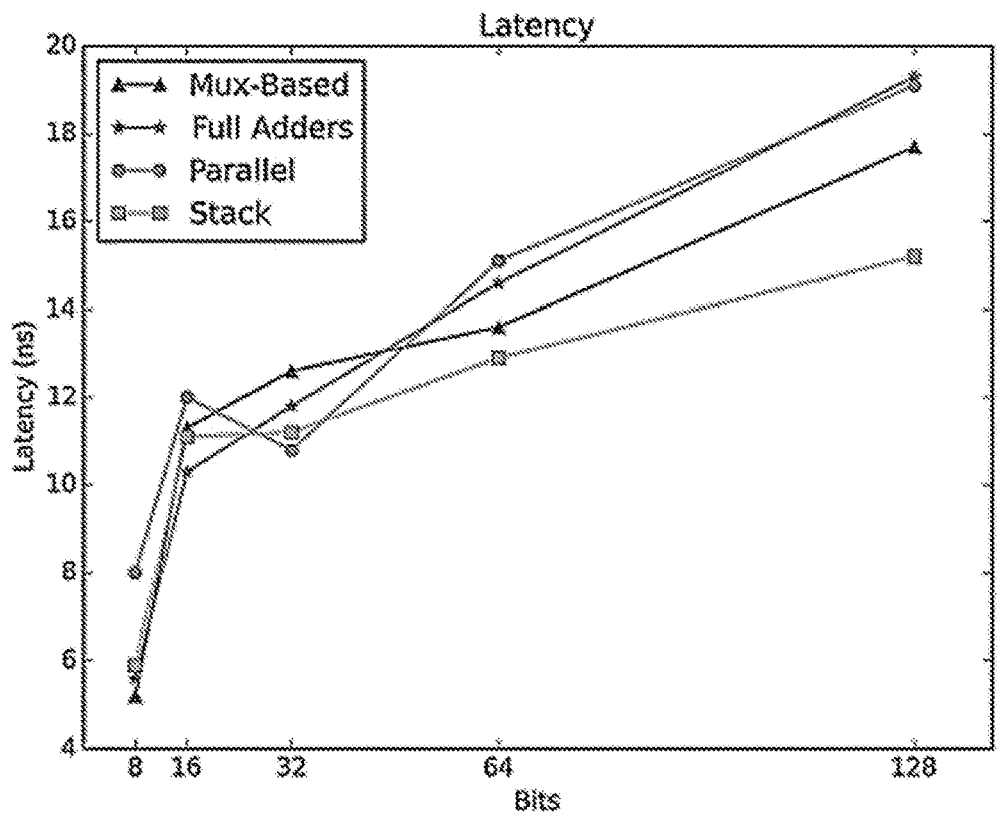
FIG. 14 is a chart showing CBW multiplier latency.

We will now discuss the collection and analysis of results. The first step in the Spectre simulation process is circuit netlist elaboration, in which all of the sub modules in the multiplier circuits are visited by the simulator. One result of this process is the calculation of circuit inventory statistics, including a node count. This node count is a count of the number of transistors in the entire design and so it is used as the circuit size in the following analysis. The size is easily verified by calculating expected size from the VHDL code: as the VHDL code comprises a purely structural list of counter submodules, total area can be calculated by simply counting the number of counters of each type and multiplying by the number of transistors in each counter, which was computed by simply counting them in the design and is presented above. After netlist elaboration, Spectre runs an initial conditions calculation using various algorithms until it nds convergence. In all cases, the dptran algorithm resulted in convergence during this stage. After this, the transient analysis begins, sweeping through the 500 ns runtime. Finally, the results are saved to disk and presented as a plot. Each multiplier circuit generally has 2b outputs. All of the outputs can be plotted on one axis as shown in FIG. 14. Then for any change in the input stimuli, the corresponding output changes can easily be considered all at once. The latency for a given change in the input stimuli is computed as the time between the inputs changing to 50% of their new value and the slowest output change to 50% of its new calculated value. The 50-50 point is a commonly used method of measuring latency in a digital circuit. Then, for all stimuli transitions, the worst case is taken as the latency of the circuit and reported in the results below.

Calculating the power consumption of each circuit was done by calculating the energy consumed during each period of output transition. For each change in input stimuli, the Spectre calculator tool was used to numerically integrate the total power consumption to compute energy in joules, for the first 20 ns after each transition. During this time the outputs stabilize. This energy value is then divided by the 20 ns runtime to return the power consumption in Watts. This number is reported as the power consumption in the results below. A commonly used metric for measuring the efficiency of a computational circuit is the Power-Delay Product with is simply the product of the latency and the power consumption, measured in Joules (or Watt-seconds). We will present the results of the simulation cases in terms of area in transistors, latency in nanoseconds, power consumption in Watts, and PDP in Joules.

Figure 15:
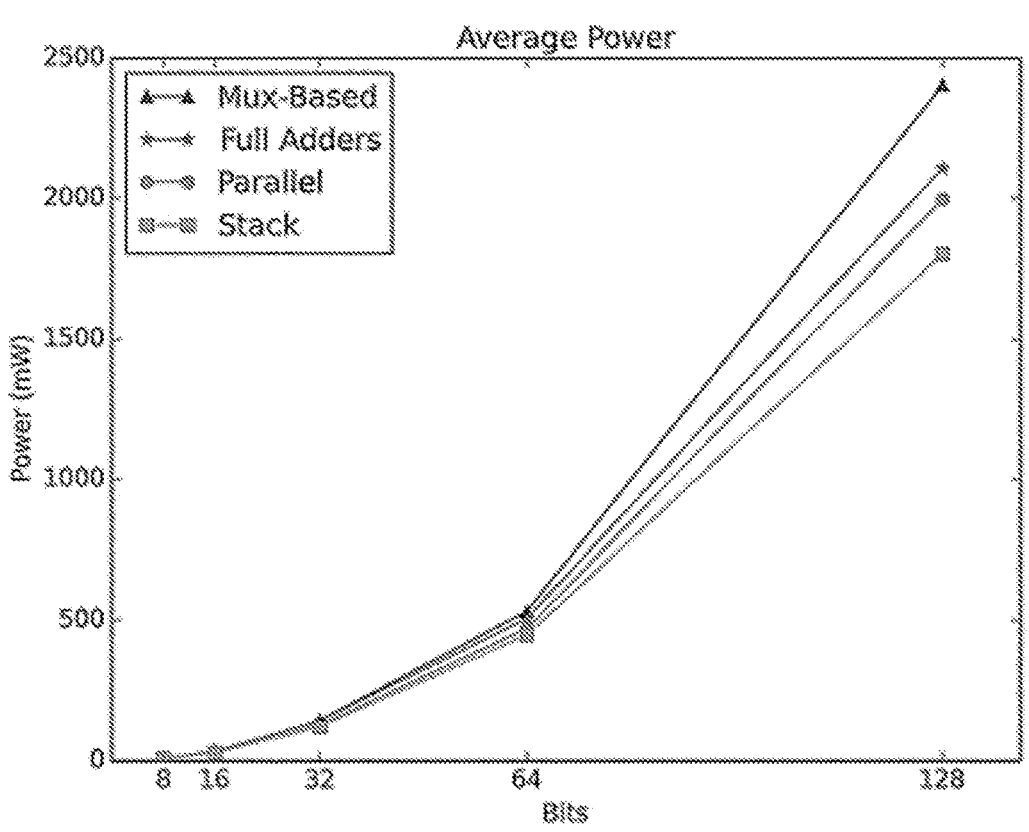
FIG. 15 is a chart showing CBW multiplier average power.
Figure 16:
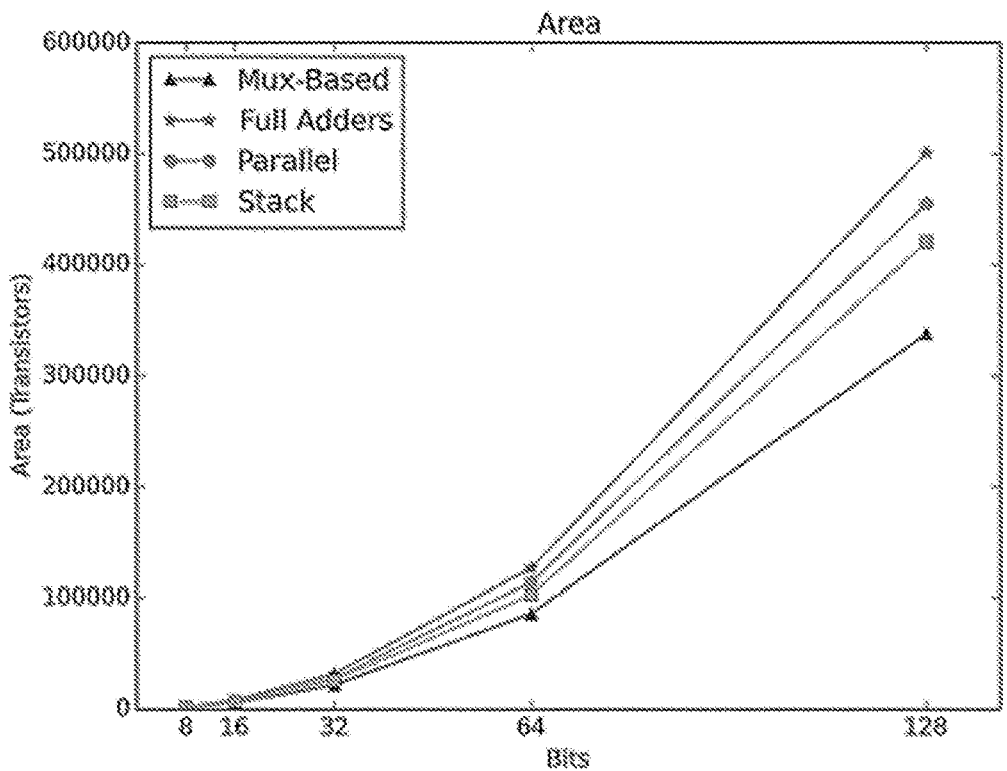
FIG. 16 is a chart showing CBW multiplier area.
Figure 17:
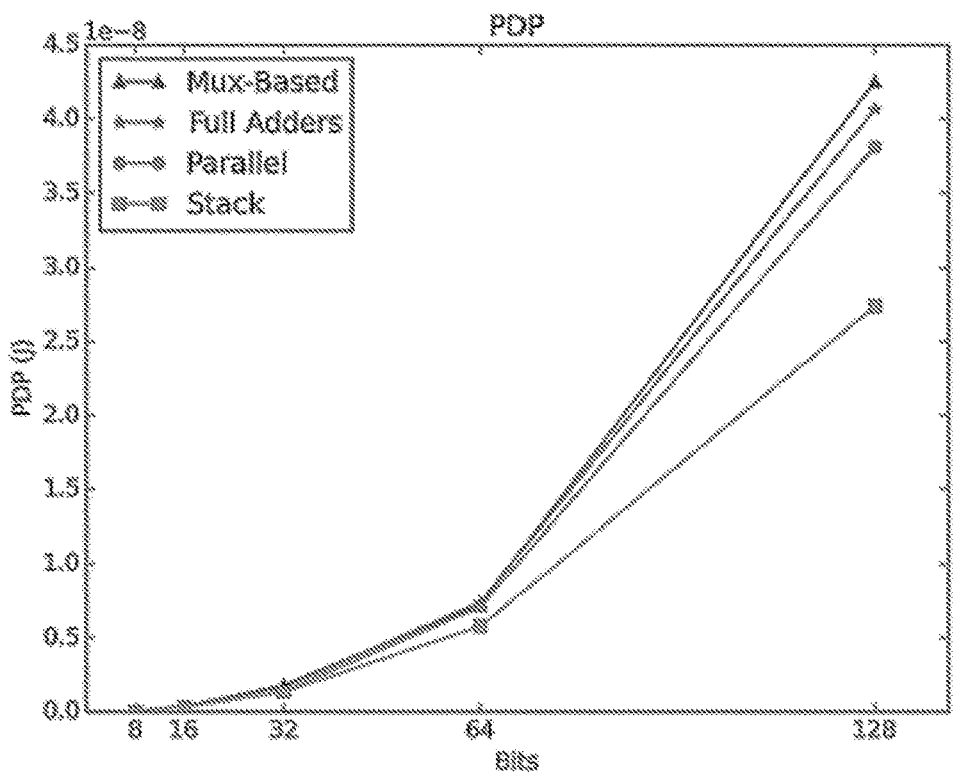
FIG. 17 is a chart showing CBW multipler PDP.

The simulation results are shown below in Table 7 for latency and average power consumption, Table 8 for area in terms of transistor count and the Power Delay Product. for the different size circuits simulated. Plots are also presented of the multipliers for each type of counter: for latency in FIG. 14, power consumption in FIG. 15, area in FIG. 16, and Power-Delay Product in FIG. 17. In the plots, each curve corresponds to a CBW multiplier using the notated internal counter. Note that for each plot there is also a curve corresponding to a standard Wallace Tree implementation not using any higher order counters, for reference.

TABLE 7

MULTIPLIER SIMULATION RESULTS - LATENCY AND POWER

| | Latency (ns) | | | | Avg. Power (mW) | | | |
|---|---|---|---|---|---|---|---|---|
| Size | Wallace | [5] | [6] | Stack | Wallace | [5] | [6] | Stack |
| 8 | 5.6 | 8.0 | 5.2 | 5.9 | 7.0 | 7.6 | 7.1 | 6.7 |
| 16 | 10.3 | 12 | 11.3 | 11.1 | 32 | 30 | 30 | 28 |
| 32 | 11.8 | 10.8 | 12.6 | 11.2 | 141 | 127 | 142 | 121 |
| 64 | 14.6 | 15.1 | 13.6 | 12.9 | 507 | 470 | 531 | 449 |
| 128 | 19.3 | 19.1 | 17.7 | 15.2 | 2107 | 1996 | 2404 | 1801 |

TABLE 8

MULTIPLIER SIMULATION RESULTS - AREA AND PDP

| | Area (Transistors) | | | | PDP (nJ) | | | |
|---|---|---|---|---|---|---|---|---|
| Size | Wallace | [5] | [6] | Stack | Wallace | [5] | [6] | Stack |
| 8 | 2k | 1.7k | 1.5k | 1.6k | 0.04 | 0.06 | 0.04 | 0.04 |
| 16 | 7.9k | 7.1k | 5.9k | 6.7k | 0.33 | 0.36 | 0.34 | 0.31 |
| 32 | 32k | 28k | 22k | 26k | 1.7 | 1.4 | 1.8 | 1.3 |
| 64 | 127k | 114k | 86k | 103k | 7.4 | 7.1 | 7.2 | 5.8 |
| 128 | 501k | 455k | 338k | 420k | 40.6 | 38.1 | 42.5 | 27.4 |

We will now comment on the results of the multiplier simulation cases. We note first that the area used by each circuit grows quadratically as predicted. Power consumption is mainly driven by the dynamic power consumption of the gates comprising each multiplier. For random input patterns, power consumption is generally expected to grow approximately with the circuit area, and this appears to hold in these results as well. We note that in terms of power consumption, smaller circuits of size 8 and 16 bits are all close to equal. However, as the size increases, the stacker-based counter yields CBW multipliers that consume less power than any other design. At 64 bits, the multiplier using the stacker-based counter consumes 5% less power than any other design, and this margin grows to 10% at 128 bits. These savings are in addition to improvements in terms of latency as we will discuss next, indicating a pure gain in terms of computational performance. Concerning latency, for small circuits up to 16 bits, the standard Wallace Tree multiplier using no higher order counters performs well. This is expected—the higher order counters incur extra overhead and when there are too few partial products to combine and do not produce much added value. However for 64 and 128 bit designs, we see that the multipliers based on the stacker-based counter are faster than any other design by up to 6% at 64-bits and 16% at 128-bits.

However, the true benefit of the stacker-based counter can be seen when considering the PDP as a measure of the computational e ciency of the multiplier circuit. Particularly for the 64 and 128 bit cases, the next fastest multiplier circuit based on the mux-based counters consumes much more power than the multiplier using the stacker-based counters. This is exposed when we consider the PDP: at 64 bits, multipliers using the stacker-based counters are at least 22% more efficient than any other design in terms of PDP. For 128-bit results, this margin increases to over 40%, as visualized in FIG. 17. In general, improving the performance of a standard circuit design in terms of latency involves a tradeoff in terms of power consumption. However, use of the presently-disclosed stacker-based design yields CBW multipliers that are faster and also consume less power than use of any other counter design or a standard Wallace Tree topology.

Full Multiplier Simulations

To demonstrate a use case of the presently-disclosed 6:3 counter, multiplier circuits of different sizes were constructed using different internal counters. No new multiplier design is presently-disclosed; rather, existing architectures are simulated with different internal counters. For reference, a standard Wallace Tree was implemented for each size. Then, a known Counter Based Wallace tree, which achieves the fewest reduction phases, was used. The internal 7:3 and 6:3 counters used for this CBW multiplier were varied. The 5:3 and 4:3 counters were kept the same for each multiplier, using the counter designs of a previous design. Standard CMOS implementations were used for the full and half adders. Because of the efficiency of the 6-bit version of the presently-disclosed counter, for simulations using the stacker-based counter, the 6-bit version was used with no 7:3 counters, even though this results in one additional reduction phase for each size. The simulation results are shown in Tables 7 and 8 (stack column is present design).

Figure 6:
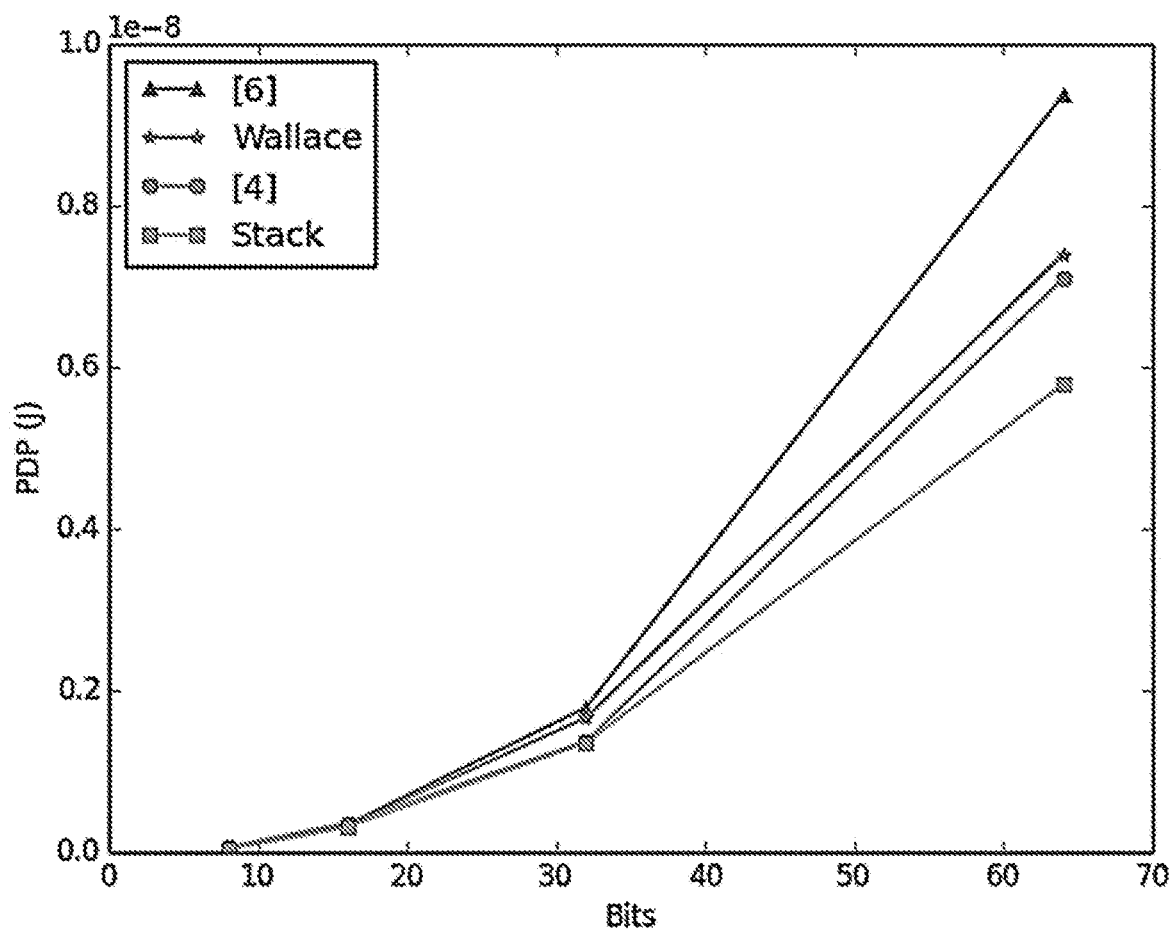
FIG. 6 is a power-delay product (PDP) for Wallace multipliers using different internal counters.

For small size, the counter has little impact on the performance of the multiplier. The standard Wallace Tree has low overhead and performs well at these sizes. We see that as the size of the multiplier increases, a Counter Based Wallace tree built using the presently-disclosed 6:3 counters is more efficient than multipliers of the same size built using a standard Wallace Tree design or using existing 7:3 counters, yielding at least a 20% reduction in PDP at 64 bits and a 40% reduction at 128 bits. The PDP for the multipliers based on each counter type is shown in FIG. 6.

A considerable part of the latency in the presently-disclosed Counter designs is due the complicated circuitry used to convert the bit stacks back to a binary count. An application that does not need a binary count but could use the stacked outputs directly would benefit from this approach even for larger numbers of bits.

Additional Applications of Stacker-Based Logic

In this section, we will discuss other applications of the bit stacking techniques discussed above. The presently-disclosed binary stacker circuits can be used as a new type of logic, particularly in applications involving bit counting. Binary multiplication is just one example of binary counters. We will now explore other problems that might benefit from the use of bit stacking. Recall that in constructing the binary stacker-based counters, a large fraction of the overhead in the design came from converting the bit stack to a binary count in the final stage. The enhanced stacker-based counter shown in FIG. 4 was able to use internal signals to reduce the overall latency and complexity of this binary conversion step, but this only works because of the limited input size. We want to use bit stacking as a new technique for a wide array of applications in computer arithmetic, but this final step may not not scale well to larger input sizes. For example, a 12-bit stack can be created using 6-bit stackers as components, but the logic needed to convert the stack into a 4-bit binary count would be very complex. Converting even larger stacks needing 5-bit counts may be difficult to do while still retaining any of the savings achieved in the 6-bit case. This is therefore the motivation to find applications that can use the stacker-based logical paradigm that can use the bit stacks directly and do not need the actual length of the count expressed as a binary number. In this chapter, we will present two such applications in very different fields.

Comparing Bit Stacks

Let us consider the classical problem of comparing the magnitude of binary numbers. Consider two b-bit numbers A and B. A binary comparator is a logical unit compares the two numbers and has outputs indicating which is larger. In an ALU, software compare instructions are often processed using subtraction. It is clear that if A>B then A−B>0 so A−B is computed using 2's complement and then the most significant bit (MSb), which functions as the sign bit, is used to determine which value is bigger. However, dedicated comparator circuits can be constructed without need for subtraction. Define a vector x in which $x_i$ indicates whether or not $A_i = B_i$:

$$x_i = A_i \oplus B_i \tag{50}$$

Then, we can compute an output Y such that if A>B then Y=1. Y can be computed as:

$$Y = A_{b-1}\overline{B_{b-1}} + x_{b-1}A_{b-2}\overline{B_{b-2}} + \ldots + (x_{b-1}x_{b-2} \ldots x_1)A_0\overline{B_0} \tag{51}$$

Figure 18:
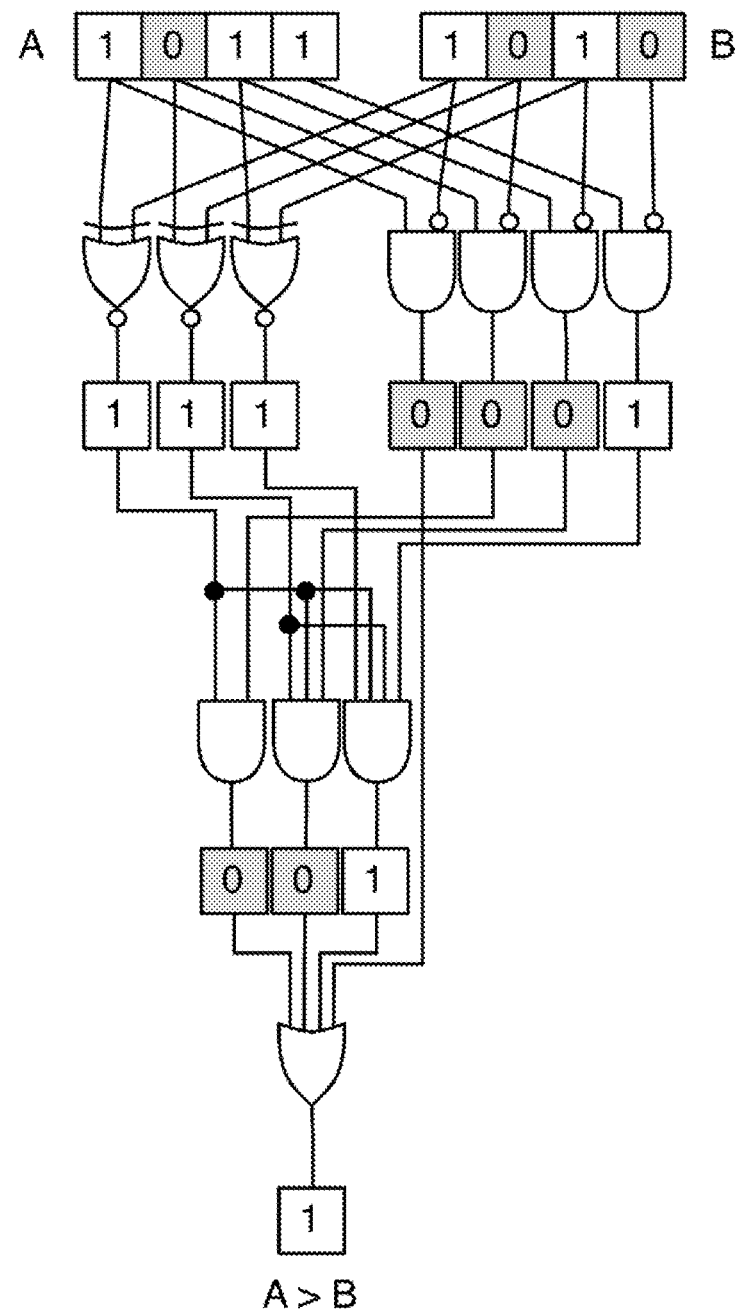
FIG. 18 is a diagram of a classic circuit for binary comparator, b=4.

In other words, we check if at any column i it is the case that $A_i = 1$, $B_i = 0$, and all of the bits to the left of column i are the same. This identifies the first bit position in which $A_i \neq B_i$ and if in that column A has a '1' bit while B has a '0' bit, thus indicating A>B. An example of this process for b=4 is shown in FIG. 18.

Now, let us discuss comparing two bit stacks to determine which is longer. Specifically, let A and B be properly defined bit stacks as defined in equation (1). We want to design a circuit that outputs a single variable Y such that Y=1 if the length of A is longer than the length of B and Y=0 otherwise. This can be computed easily as:

$$Y = A_{b-1}\overline{B_{b-1}} + A_{b-2}\overline{B_{b-2}} + \ldots + A_0\overline{B_0} \tag{52}$$

Figure 20:
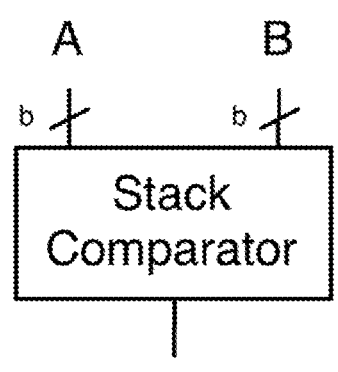
FIG. 20 is a diagram of a stack comparator module.
Figure 21:
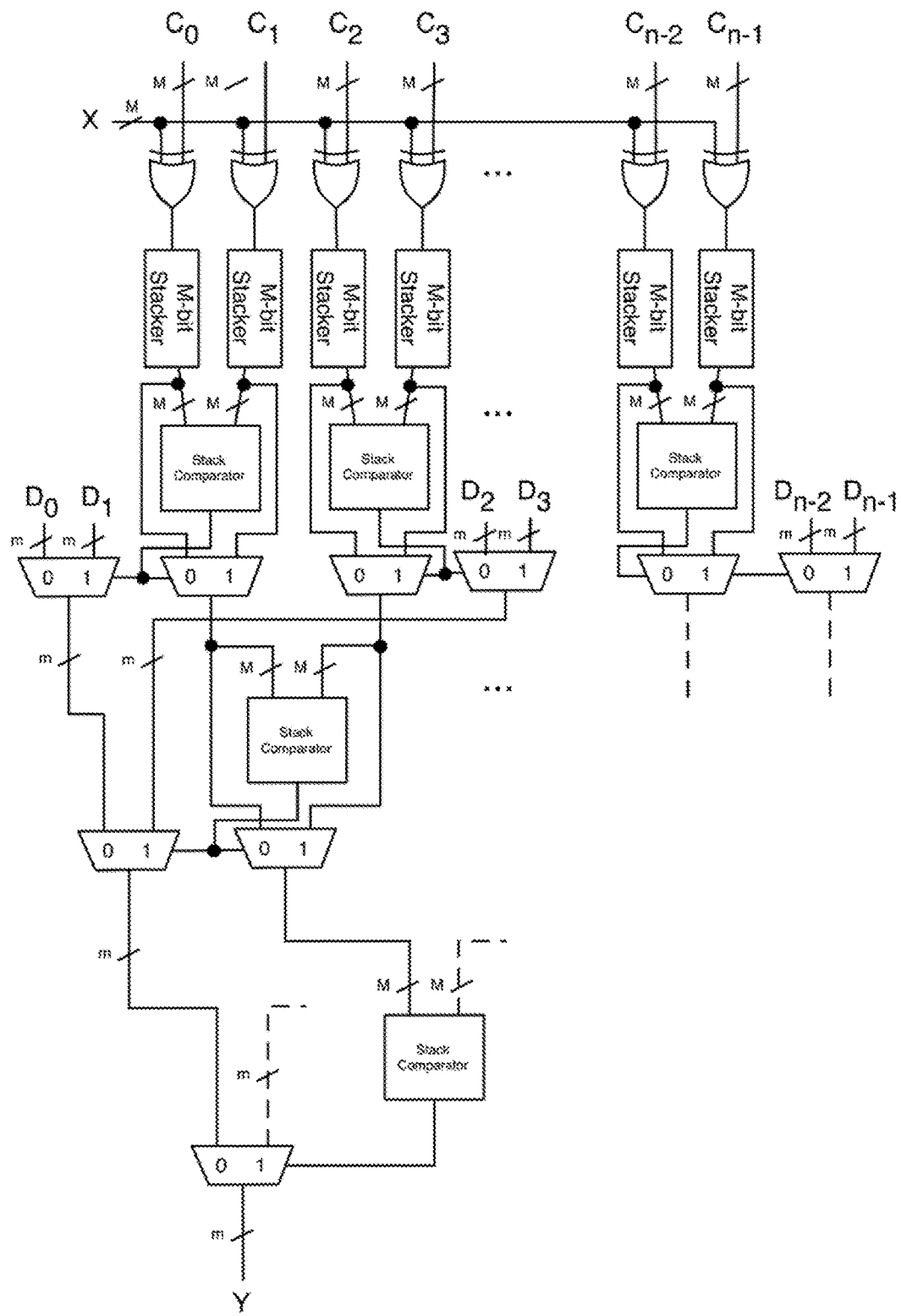
FIG. 21 is a diagram of a decoder for block error correcting codes based on bit stackers.

Namely, we identify whether for any i<b, it is the case that $A_i = 1$ while $B_i = 0$, thus indicating that the A stack is longer than the B stack. Note that this process is similar to the standard comparator design in equation (2), but because A and B are properly stacked, we do not need to check that every pair of bits to the left of each column is the same. This process is shown in the example in FIG. 20 for b=6. We will abstract this bit stack comparator as in FIG. 21. Note that while this comparator is much simpler to implement than the standard binary comparator, it only works because of the assumption that A and B are proper bit stacks. It does not work as a general purpose binary comparator, but if an application requiring comparison of different quantities can be defined in terms of bit stacks, this stack comparator will be particularly efficient.

Decoder for Error Correcting Codes

In communications, block error correcting codes are used for fault tolerant transmission of information between a transmitter and a receiver. To transmit m data bits over a noisy channel, first each data word is encoded using M bits where M>m. The code words all designed such that the Hamming Distance between every pair, $d_H$, satisfies $d_H > 2e+1$, where e is the maximum number of correctable errors. The Hamming Distance is defined as the number of positions at which a pair of binary vectors differs. The receiver of the code word decodes by finding the closest match between the received word and all possible correct code words. Because of the spacing between the code words, as long as no more than e bits are flipped by the communication channel, the received code word can still be decoded to the correct data word. Many error correcting codes exist; some very widely used error correcting codes are the Hamming Code and Golay Code. A method of comparing the received code word to the entire set of correct codewords in parallel using XOR gates was shown, which will output a '1' in bit positions that do not match. Other types of decoders for error correcting codes use similar techniques involving an XOR mask and some network to minimize the Hamming Distance. The problem of decoding can then be reduced to counting the '1' bits in each comparison vector and selecting the minimum. This minimum is then used to select the corresponding data word.

When framed in this way, the design of a decoder for block error correcting codes can be implemented using the bit stacking logic and comparators of bit stacking circuits. For a set of n datawords called $D_0, D_1, \ldots D_{n-1}$, each of m bits, we can write $m = \log_2 n$. These data words will be encoded into n codewords called $C_0, C_1, \ldots C_{n-1}$, each of M bits. The codewords are then transmitted over a communication channel. A receiver accepts the bits from the channel and must then decide which codeword was transmitted. Various sources of noise can cause errors to occur in the channel, resulting in one or more bits being flipped. The decoder's job is therefore to determine which of the correct codewords is closest to the received codeword. Formally, given an M bit received codeword X, the output of the decoder Y should be the dataword corresponding to the codeword that has the minimum Hamming Distance from X $$i = \underset{j}{\operatorname{argmin}} \, d_H(X, C_j) \tag{53}$$

$$Y = D_i \tag{54}$$

Figure 19:
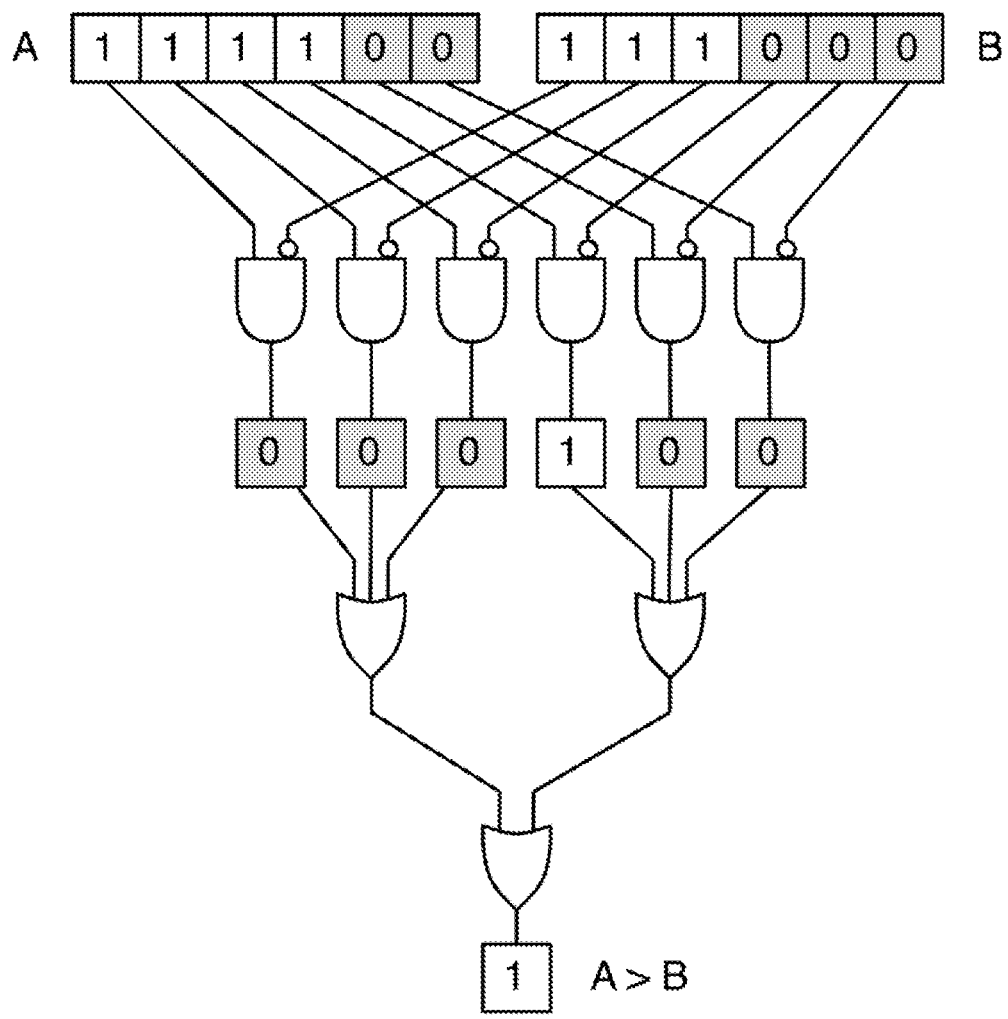
FIG. 19 is a diagram of a stack comparator, b=6.

Normally, this would be implemented in hardware by first computing the Hamming Distance between X and all of the $C_i$ using XOR (similarity) gates followed by a counter circuit to count the number of mismatches. Then a tree of numerical comparators, like the one shown in FIG. 18, would be used to minimize the Hamming Distance. In parallel with this minimization, the datawords $D_i$ would be passed along, so that the dataword with the smallest Hamming Distance from X can be output after the minimum Hamming Distance is determined. We can modify this method to use bit stackers instead as follows: we will still use the XOR gates to identify the bits that are different between X and each of the $C_i$. However, instead of using a bit counter, we will instead use an M-bit Stacker and then a tree of M-bit Stack Comparators, as shown in FIG. 19. While the tree is the same depth, an M-bit stacker has less complexity than an M-bit counter, and comparing M-bit stacks could also be less complex than comparing $\log_2$ M-bit binary numbers (no XOR gates are needed and the only logical complexity comes from the M input OR gate). It is believed that the decoder for block error correcting codes using bit stackers could produce savings in terms of latency or power consumption over other parallel methods. This stacker-based decoder implementation, which computes the output Y by finding the dataword corresponding to the codeword with minimum Hamming Distance from X, satisfying eq. (54), is shown in general in FIG. 21.

Approximate String Matching

String matching (or string searching) algorithms form a class of algorithms on strings that locate matches of a string (or pattern) in a larger string or text. There are many applications including electronic surveillance, search engines, pattern matching in biological genomes, and so forth. A related problem is called approximate string matching, which is also know as fuzzy string matching, which seeks to find close matches of a given substring that may not be exact matches. This has many varied applications as well, including spell checking, spam filtering in email, and matching of nucleotide sequences in large sections of DNA data. Because of the importance of string matching in many fields, hardware accelerators have been proposed. These dedicated circuits can perform string matching very quickly making use of the parallelism offered by FPGAs. A subclass of the approximate string matching algorithms allow for detecting approximate matches including insertions or deletions (called indels). In these problems, we want to locate a pattern in a larger text but allow for several missing or extra characters. We will present a way to use Bit Stacking in approximate string matching problems that do not allow for these indels; however, there may be extensions that can use Bit Stacking and also allow for indels.

Consider an alphabet with A distinct characters. Then we can use $b=\log_2 A$ bits to encode the symbols in this alphabet. Now, assume we are searching for a string S of n characters $S=S_0, S_1, \ldots, S_{n-1}$ in a larger text T of N characters. A simple method was described for checking for a match with the first n characters of T by comparing each symbol in parallel and logically ANDing the result. The input text is then shifted by one character and the process is repeated.

Now assume that we want to detect approximate matches by using a threshold, in which we consider at least t out of n character matches to be a valid match of the substring, and we output a '1'. This problem can easily be solved using a bit stacker circuit: first, each symbol in S is compared to the corresponding symbol in T using XNOR (similarity) gates on each bit of the symbols followed by an AND gate to check that all bits match. This forms a new vector X:

$$X_i = (S_{i_0} \oplus T_{i_0})(S_{i_1} \oplus T_{i_1}) \ldots (S_{i_{b-1}} \oplus T_{i_{b-1}}) \quad i=0 \ldots n-1 \tag{56}$$

Next, X is passed into an n-bit stacker to form the bit stack $X_s$. Now, to check whether the number of matches is at least the threshold t, instead of using an expensive counter, we can simply check that the stack is longer than or equal to length t:

$$Y = X_{s_t} \tag{57}$$

Figure 22:
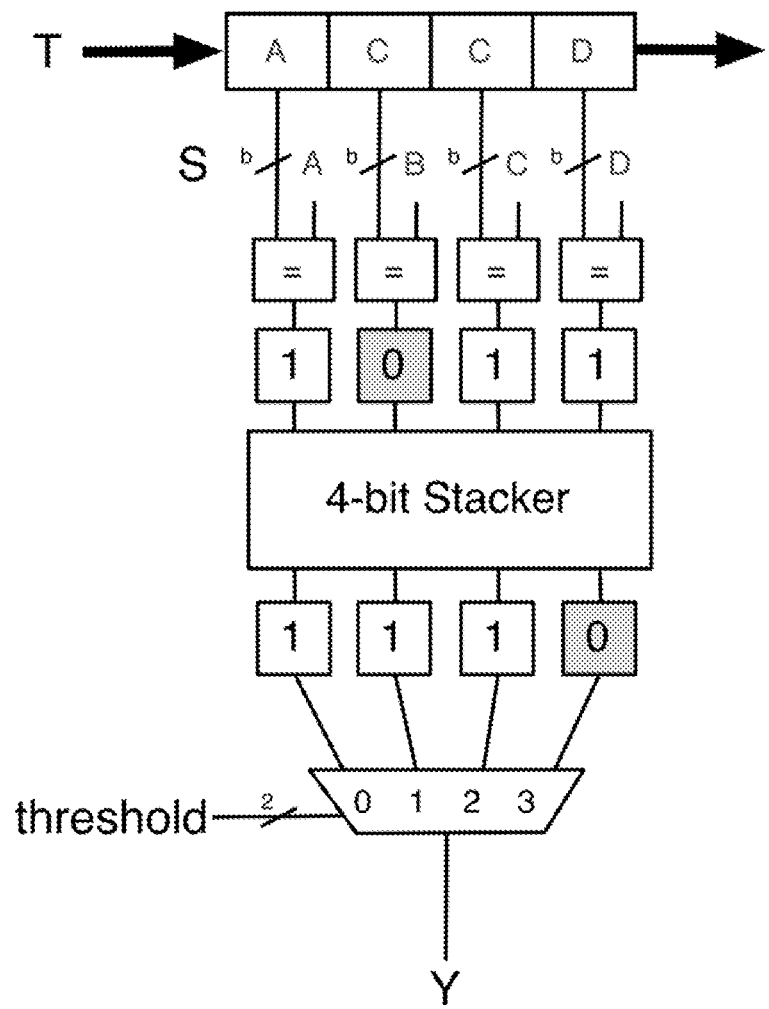
FIG. 22 is a diagram showing approximate string matching using bit stackers with selectable threshold, n=4.

The threshold t could be made selectable by using a mux on $X_s$. This string matching technique is illustrated with an example in FIG. 22.

Stack to Binary Conversion Using Dynamic Gates

In this disclosure, we have relied completely on static CMOS logic as it is preferable when power consumption is a dominant constraint. However, if we allow ourselves to use dynamic logic, which relies on a clock signal and uses transistor capacitance to store values, the conversion of a bit stack to a binary count can be performed very efficiently. We have identified two applications in this chapter for which the conversion to binary count is not necessary, but bit stackers could be used to build general counters of bigger sizes given a scalable binary conversion method.

Let X be a bit stack of length b that needs to be converted to a binary count Y consisting of $\log_2 b$ bits. As implied in (31), we can convert X into a vector that has exactly one '1' bit called $X_s$ as follows:

$$X_{s_0} = \overline{X_0} \tag{58}$$

$$X_{s_i} = X_i \overline{X_{i+1}} \quad i=1 \ldots b-2 \tag{59}$$

$$X_{s_{b-1}} = X_{b-1} \tag{60}$$

Figure 23:
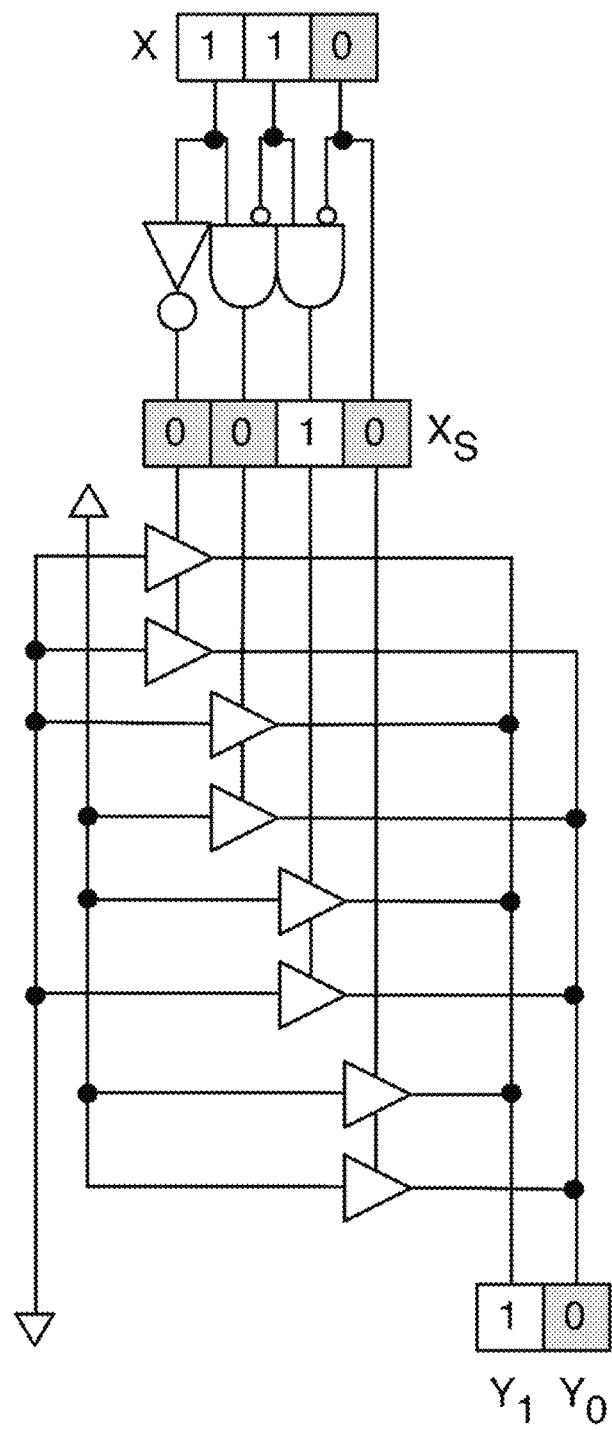
FIG. 23 is a diagram showing conversion to binary count using Wired-Or, b=4.

Intuitively, the single '1' bit in $X_s$ will then be used to select the correct output count for each of the $\log_2 b$ of Y. This process can be abstracted to the use of tri-state buffers, as shown in FIG. 23, in which each bit of Y is connected to the correct binary count based on the '1' bit of $X_s$. In practice, this sort of configuration is called a Wired-Or as it essentially computes the logical OR of many signals, and can be implemented using dynamic logic gates. This design type has several drawbacks, including the reliance on a clock signal, higher power consumption, and the fact that one dynamic gate can not drive another without using a style of logic design known as Domino Logic. However, depending on the application, this method of converting a bit stack to a binary count using dynamic logic could be used to create bigger counters with high performance.

Although the present disclosure has been described with respect to one or more particular embodiments, it will be understood that other embodiments of the present disclosure may be made without departing from the spirit and scope of the present disclosure.

We claim:

1. A method of stacking a 2b-bit binary vector, comprising:
    splitting the 2b-bit vector into a first set of b bits, and a second set of b bits, wherein no bits of the 2b-bit vector are used in both the first set and the second set;
    stacking the first set such that any bits having a value of '1' occupy the least significant bits;
    stacking the second set such that any bits having a value of '1' occupy the most significant bits;
    determining, for each bit of the first set and the second set, if a bit of the first set or a corresponding bit of the second set has a value of '1', and setting a corresponding bit of a third set to '1';
    determining, for each bit of the first set and the second set, if a bit of the first set and a corresponding bit of the second set has a value of '1', and setting a corresponding bit of a fourth set to '1';
    stacking the third set such that any bits having a value of '1' occupy the most significant bits; and
    stacking the fourth set such that any bits having a value of '1' occupy the most significant bits.

2. The method of claim 1, further comprising concatenating the stacked third set and the stacked fourth set to form an 2b-bit stacked output.

3. The method of claim 1, wherein stacking the first set comprises:
    stacking the first set such that any bits having a value of '1' occupy the most significant bits; and
    reversing the first set.

* * * * *